(12) United States Patent
Erickson et al.

(10) Patent No.: US 11,449,947 B2
(45) Date of Patent: Sep. 20, 2022

(54) SUBROGATION CASE MANAGEMENT

(71) Applicant: HEALTH MANAGEMENT SYSTEMS, INC., Irving, TX (US)

(72) Inventors: Justin Erickson, Pittsburgh, PA (US); Trisha Henry, Chillicothe, OH (US); Ben Schy, Superior, CO (US); Maura McCormick, Charlestown, MA (US)

(73) Assignee: HEALTH MANAGEMENT SYSTEMS, INC., Irving, TX (US)

( * ) Notice: Subject to any disclaimer, the term of this patent is extended or adjusted under 35 U.S.C. 154(b) by 243 days.

(21) Appl. No.: 16/840,167

(22) Filed: Apr. 3, 2020

(65) Prior Publication Data
US 2020/0320638 A1 Oct. 8, 2020

Related U.S. Application Data

(60) Provisional application No. 62/830,092, filed on Apr. 5, 2019.

(51) Int. Cl.
*G06Q 40/00* (2012.01)
*G06Q 40/08* (2012.01)
*G06N 7/00* (2006.01)

(52) U.S. Cl.
CPC ............ *G06Q 40/08* (2013.01); *G06N 7/005* (2013.01)

(58) Field of Classification Search
CPC ......... G06Q 40/00; G06Q 40/08; G06N 7/005
See application file for complete search history.

(56) References Cited

U.S. PATENT DOCUMENTS 8,566,129 B1 * 10/2013 Schwarz ............... G06Q 30/06
705/4
8,688,470 B1 * 4/2014 Ambrose ............... G06Q 10/10
705/2

(Continued)

FOREIGN PATENT DOCUMENTS

CN 113963149 A * 1/2022

OTHER PUBLICATIONS

[PDF] Trends and Practices in Healthcare Subrogation MJ Brien, CWA Panis—2013—dol.gov (Year: 2013).*

Primary Examiner — Lalita M Hamilton
(74) Attorney, Agent, or Firm — Perkins Coie LLP

(57) ABSTRACT

Methods, apparatus and systems for managing subrogation cases are described. In one example aspect, a method for facilitating automated subrogation case processing includes transmitting a query that includes information indicative of an incident associated with a member to a database; receiving a response to the query indicative of associated medical information for the member; retrieving, based on the received response, medical claims associated with the member; computing a first probability value for each retrieved medical claim, the first probability indicating a relatedness of the medical claim to the incident; determining, for each retrieved medical claim, whether the medical claim is related to the incident by comparing the first probability value with a first predefined threshold; computing a second probability value indicating whether all medical claims related to the incident are present; and generating a final determination for the incident by comparing the second probability value with a second predefined threshold.

14 Claims, 33 Drawing Sheets

(56) References Cited

U.S. PATENT DOCUMENTS

| | | | | |
|---|---|---|---|---|
| 2004/0111302 A1* | 6/2004 | Falk | ................. | G06Q 40/00 |
| | | | | 705/4 |
| 2007/0219824 A1* | 9/2007 | Rawlings | ............... | G06Q 10/10 |
| | | | | 705/2 |
| 2011/0022408 A1* | 1/2011 | Pramik | ................. | G16H 10/60 |
| | | | | 705/2 |
| 2017/0372432 A1* | 12/2017 | McKown | ............... | G06Q 10/10 |
| 2018/0107734 A1* | 4/2018 | Galia | ..................... | G06F 16/35 |
| 2021/0326992 A1* | 10/2021 | Leise | ..................... | H04L 63/12 |

* cited by examiner

FIG. 9A

Home

Recently Updated

- Record 03/11/2019 02:58 PM
  Doe, John
  06/02/2012

- Record 03/08/2019 09:53 AM
  Doe, John
  06/02/2012

- Record 03/04/2019 11:22 AM
  Doe, John
  06/02/2012

- Record 03/04/2019 10:25 AM
  Doe, John
  06/02/2012

- Record 03/04/2019 10:23 AM
  Doe, John
  06/02/2012

① Case — ② Authorization — ③ Claims — ④ Claim/Lien — ⑤ Settlement — ⑥ Payment Please continue by filling in or editing these fields.

State: OHIO    Casualty Product: OH Casualty    HMS Case ID:    Case Status: OPEN    Date of Incident: 06/02/2012

Member Name:    SSN:    Medicaid ID:    Date of Birth: 09/19/2003    Case Type: Automotive

Member Information

Address 1* [ 901 ]    Address 2 [ ]    Zip Code* [ 75038 ]    City* [ Irving ]    State* [ TX ]

Phone Number* [ ]    Email* [ ]

○ ●

Save

Incident Information ＋

Plaintiff Attorney ＋

Defense Attorney ＋

Liable Person Involved ＋

Medical Authorization Request

Medical Authorization Process — 1201

Med Auth Review Process: Electronic

Plaintiff Attorney Name: Electronic

Plaintiff Attorney Address:

Plaintiff Attorney Email:

Member Name:

HMS Case ID:

Date of Incident: 06/02/2012

Member Email:

AUTHORIZATION TO DISCLOSE HEALTH INFORMATION

I, _____ understand that my information, which is retained by the OH Casualty, may not be disclosed to a third party without my expressed written authority, unless permitted or required by law. I hereby authorize Health Management Systems, Inc. a contractor for the OH Casualty to disclose my information to:

Individual's Name or Class of Individuals: _____

Organization/Entity (if applicable): _____

Address: _____

Telephone Number: _____ Fax Number: _____

Email: _____

Describe the information to be disclosed and Purpose of the information to be released.

Check all that apply:
( ) Entire medical record

[Preview] [Generate] [Print]   [Refresh]

Medical Authorization Response

| Med Auth Review Process | Document Type | Effective Date | Expire Date | Release Type | Full Valid Signature/ Initials received | Exceptions | Valid Signature/Initials for Exception(s) received | Additional Note(s) | View |

FIG. 12

| Case | Authorization | Claims | Claim/Lien | Settlement | Payment |
|------|---------------|--------|------------|------------|---------|
| ① | ② | ③ | ④ | ⑤ | ⑥ |

Here are the claims associated with this case.

| State | Casualty Product | HMS Case ID | Case Status | Date of Incident |
|-------|------------------|-------------|-------------|------------------|
| OHIO  | OH Casualty      |             | OPEN        | 01/01/2011       |

| Member Name | SSN | Medicaid ID | Date of Birth | Case Type |
|-------------|-----|-------------|---------------|-----------|
|             |     |             |               | Automotive |

Claim Summary

| Type | Claim Count | Charge Amount | Defense Attorney Contact |
|------|-------------|---------------|--------------------------|
| Related | 0 | $0.00 | $0.00 |
| Unrelated | 1 | $0.00 | $0.00 |
| Total | 1 | $0.00 |  |

Show All

No of records in the page  20 ▼

Claim Details

| Type | Provider | Date of Service | Diagnosis | Service | Paid Amount | Related? | View Comments |
|------|----------|-----------------|-----------|---------|-------------|----------|---------------|
| Original Claim | Prince, Clifton J/ 1154313203 | 06/17/2016 | E119 / Type 2 DM Witho.... | 99285 / Emergency Dept Vis.... | $0.00 | Yes ◯ ⎬ 1901 |  |

<< 1 >>

Save  Submit            Back            Next

FIG. 19

ROCKET SUBRO

| Related | $13,091.85 |
| Unrelated | $0.00 |
| Total | $13,691.85 |

Claim Dispute comments ✕

Please provide relevant comments for your claim dispute

[ Cancel ] [ Save ]

— 2003

Claim Details

No of records in the page [ 20 ▼ ] [ Show All ]

| Type | Provider | Date of Service | Diagnosis | Service | Paid Amount | Related? | View Comments |
|---|---|---|---|---|---|---|---|
| Original Claim | ABC | 10/27/2016 | | OB US Detailed Sngl Fetus... | $0.00 | Yes | |
| Original Claim | ABC | 10/27/2016 | | Emergency Dept Visit / 992... | $0.00 | Yes | |
| Original Claim | ABC | 10/27/2016 | | PET Image w/CT Skull-Thig... | $0.00 | Yes | |
| Original Claim | ABC | 10/27/2016 | | THER/Proph/Diag Inj SC/Im... | $0.00 | Yes | |
| Original Claim | ABC | 10/27/2016 | | Drain/Inj Joint/ Bursa w/o... | $0.00 | Yes | |
| Original Claim | ABC | 10/27/2016 | | Self Admin/Drug/ 637 | Se... | $0.00 | Yes | |
| Original Claim | ABC | 10/27/2016 | | Hydrate IV Infusion Add-O... | $0.00 | Yes | |
| Original Claim | ABC | 09/12/2017 | | THER/Proph/Diag Inj SC/Im... | $30.26 | ● No | |

| Case | Authorization | Claims | Claim/Lien | Settlement | Payment |
| --- | --- | --- | --- | --- | --- |
| ① | ② | ③ | ④ | ⑤ | ⑥ |

Settlement / Compromise Request

State
OHIO

Casualty Product
OH Casualty

HMS Case ID

Case Status
OPEN

Date of Incident
01/01/2011

Member Name

SSN

Medicaid ID

Date of Birth

Case Type
Automotive

Settlement Information

Settlement Date*
02/28/2019

Total Settlement Amount ($)*
50,000.00

Attorney Fee (%)*
500.00

Court Costs, Expenses ($)*
10,000.00

Total Fees and Expenses ($)*
75,000.00

Medicaid Claim/Lien Amount with Pro Rata ($)
0.00

Attorney's Compromise Offer Amount ($)
50,000.00

Total Fees ($)
325,000.00

Save

Would you like to submit a compromise request ● No

Back | Next

FIG. 25

SUBROGATION CASE MANAGEMENT

CROSS REFERENCE TO RELATED APPLICATIONS

This application claims the benefit of and priority to U.S. Patent Application No. 62/830,092, filed on Apr. 5, 2019. The entire content of the aforementioned patent application is incorporated by reference in its entirety as part of the disclosure of this application.

BACKGROUND

Subrogation is a term describing a legal right to legally pursue a liable first or third party that caused the loss to the insured member. This is done to recover the amount of the medical claim(s) paid by the health plan to for the loss. Subrogation is a significant part in health claims management—it allows the liability associated with payment of medical costs to be shifted to the appropriate liable party, allowing health plans of the members to maintain low premiums.

BRIEF DESCRIPTION OF THE DRAWINGS

FIG. 9A is an example screenshot of a user interface showing member information provided for case creation in accordance with one or more embodiments of the present technology.

FIG. 9B is an example screenshot of a user interface showing incident information provided for case creation in accordance with one or more embodiments of the present technology.

FIG. 9C is an example screenshot of a user interface showing plaintiff attorney information provided for case creation in accordance with one or more embodiments of the present technology.

FIG. 9D is an example screenshot of a user interface showing defense attorney information provided for case creation in accordance with one or more embodiments of the present technology.

FIG. 9E is an example screenshot of a user interface showing liable person information provided for case creation in accordance with one or more embodiments of the present technology.

FIG. 9F is an example screenshot of a user interface showing liable insurance companies provided for case creation in accordance with one or more embodiments of the present technology.

FIG. 12 is an example screenshot of a user interface showing an authorization form in accordance with one or more embodiments of the present technology.

FIG. 19 illustrates an example screenshot of a user interface showing claim relatedness in accordance with one or more embodiments of the present technology.

FIG. 20 illustrates another example screenshot of a user interface showing a claim relatedness dispute in accordance with one or more embodiments of the present technology.

FIG. 23 illustrates an example screenshot of a user interface showing an example letter issued by the platform.

FIG. 25 illustrates an example screenshot of a user interface showing a settlement request in accordance with one or more embodiments of the present technology.

DETAILED DESCRIPTION

Subrogation plays an important role within the health care sector. For example, a Medicaid member or health insurance policyholder is injured in an accident and the Medicaid agency or the health insurance company pays the medical bills. The same health plan is allowed to collect the medical bills from the at-fault party to reconcile the payment. Subrogation typically pursues claims in the areas of personal injury causes of action, such as automobile insurance and workers compensation for third party claims.

Currently, information regarding a subrogation case can be provided by the insurance company of the at-fault party or by the attorneys. Information is typically provided in various forms—email, fax, or a piece of paper via mail. Information may also be provided via an independent online portal. Parties sometimes send the same information multiple times in multiple ways. Furthermore, subrogation experts and staff members are required to identify accident related claims and determine the claim/lien amount for all cases. The lack of unified ways of managing information and the extent of manual efforts involved can cause great delay in case processing.

The disclosed embodiments relate methods, system and devices that manage various types of information associated with subrogation cases to improve the efficiency of computations and management of subrogation case processing based on computing systems and associated architectures. In some embodiments, a subrogation case management platform can be implemented to provide a central portal to manage information. The subrogation case management platform can automatically determine whether claims are related to the case and whether a final claim/lien recommendation can be issued, thereby reducing manual effort involved and reducing case processing time.

Figure 1:
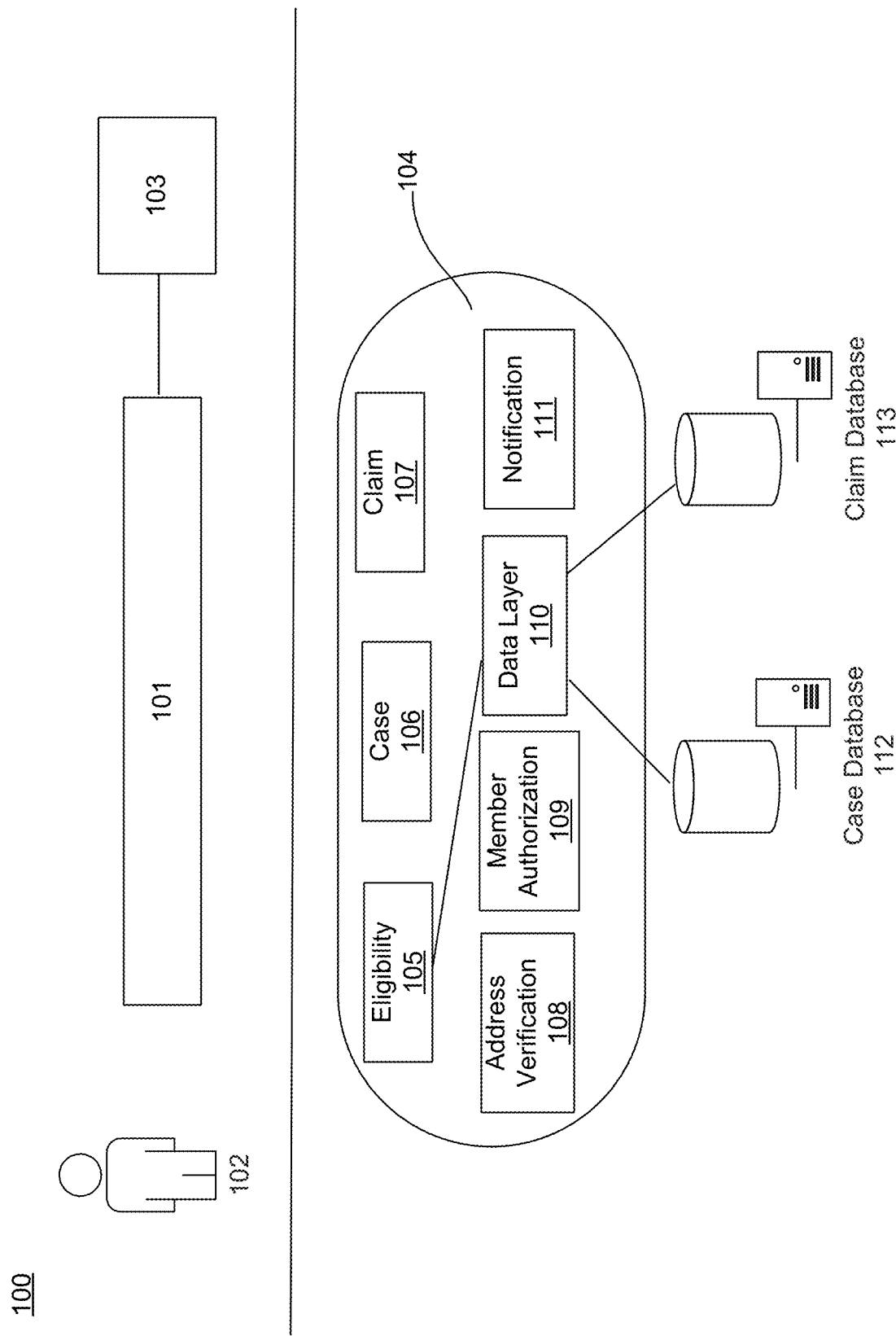
FIG. 1 illustrates an example architecture of a subrogation case management platform in accordance with one or more embodiments of the present technology.

FIG. 1 illustrates an example architecture of a subrogation case management platform 100 in accordance with one or more embodiments of the present technology. The platform 100 includes a presentation layer 101 that provides a user-interface for the member 102 to interact with the platform. An identity management module 103 can be provided to check the credentials of the member 102 to ensure the member 102 can securely log into the platform.

The platform 100 also provides various services in the service layer 104. The eligibility service 105 fetches member and eligibility information from a case database 112 via the data layer as part of real-time case creation. The case-management service 106 creates new cases, checks duplicate cases, performs address verification 108 of the member address, obtains medical authorization 109, determines claim evaluation probability scores based on information in the claim database 113, associates related claims to the case, performs lien calculation, generates the final lien, and provides notifications 111 to the member regarding updates of the case. The claim-management service 107 provides real-time updates to the case information using data from the case database 112 and claim database 113.

Figure 2:
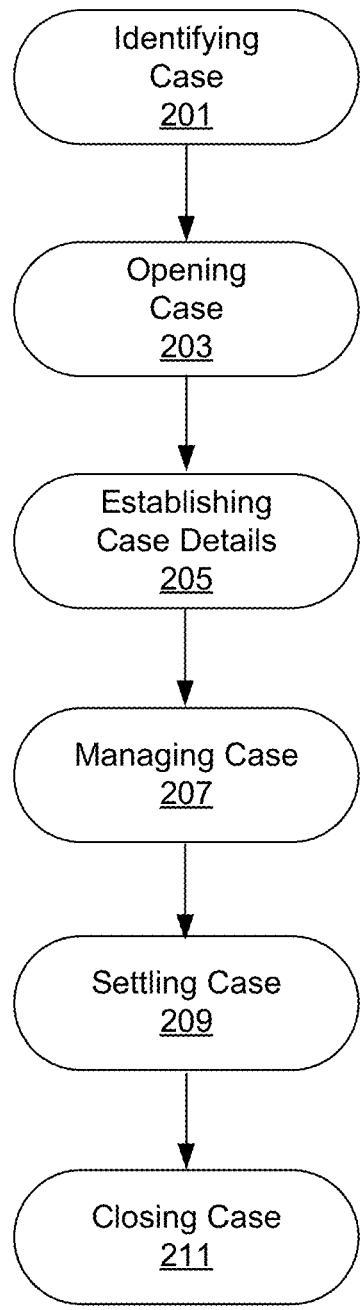
FIG. 2 illustrates an example workflow of a subrogation case management platform in accordance with one or more embodiments of the present technology.

FIG. 2 illustrates an example workflow of a subrogation case management platform in accordance with one or more embodiments of the present technology. At operation 201, information is provided to the platform, by an attorney representing the member, to identify a case. The relevant information includes member information and/or date of incident. Based on eligibility of the member, the platform decides if there is a need to open a case at operation 203. Details about the case are established at operation 205 after the case is opened. For example, member history, names of attorney, insurance company and liable person(s) can be entered into the platform. In some embodiments, relevant information can be imported from a third-party system. At operation 207, the platform provides an interface to allow the attorneys to manage the case, such as tracking the status of the case and reviewing relevant documents related to the case. At operation 209, a compromise can be proposed, and the case can be settled between the parties. Once parties reach a settlement agreement, the case can be closed at operation 211 after the settlement amount is paid. In some embodiments, final reports about the case are completed and all relevant files are archived by the platform.

Member Eligibility

Figure 3:
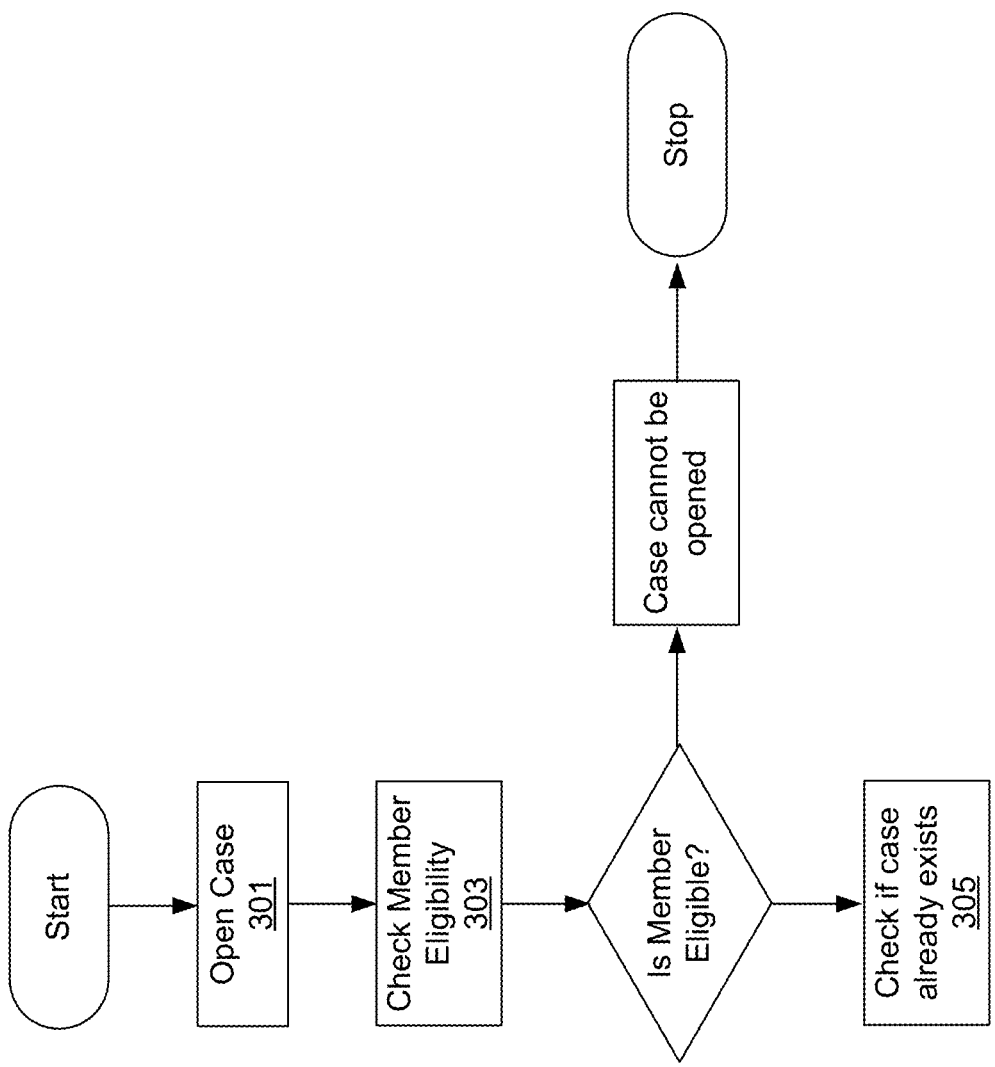
FIG. 3 is a flowchart representation of a member eligibility determination process in accordance with one or more embodiments of the present technology.

FIG. 3 is a flowchart representation of a member eligibility determination process in accordance with one or more embodiments of the present technology. An insurance agent or an attorney attempts to open a case at operation 301. Before the platform opens the case, the platform first check, at operation 303, if the attorney's client or insurance company's claimant is an eligible member. For example, eligibility can be determined by information such as the Social Security Number (SSN), the Date of Birth (DOB), first and last name of the client or the claimant. In some embodiments, the date of incident (DOI) is used to determine if the client or the claimant is eligible at the time of the incident. If a member is eligible, and the case can be created. In some embodiments, the case is created after the DOI so that there is sufficient time to respond any inquiries regarding the incident. After the case is created, the platform proceeds to determine if the case for the party already exists at operation 305. If the member data does not exist in the eligibility database, the attorney or insurance agent can be notified that the client/claimant is not an eligible health plan member.

Figure 4:
FIG. 4 is an example screenshot of a user interface for checking member eligibility in accordance with one or more embodiments of the present technology.

FIG. 4 is an example screenshot of a user interface for checking member eligibility in accordance with one or more embodiments of the present technology. As shown in FIG. 4, in some embodiments, a search of eligibility data is performed based on one or more of the following fields: the first name of the client 401, the last name of the client 402, the date of birth of the client 403, the social security number 404, and date of incident 405.

Figure 5:
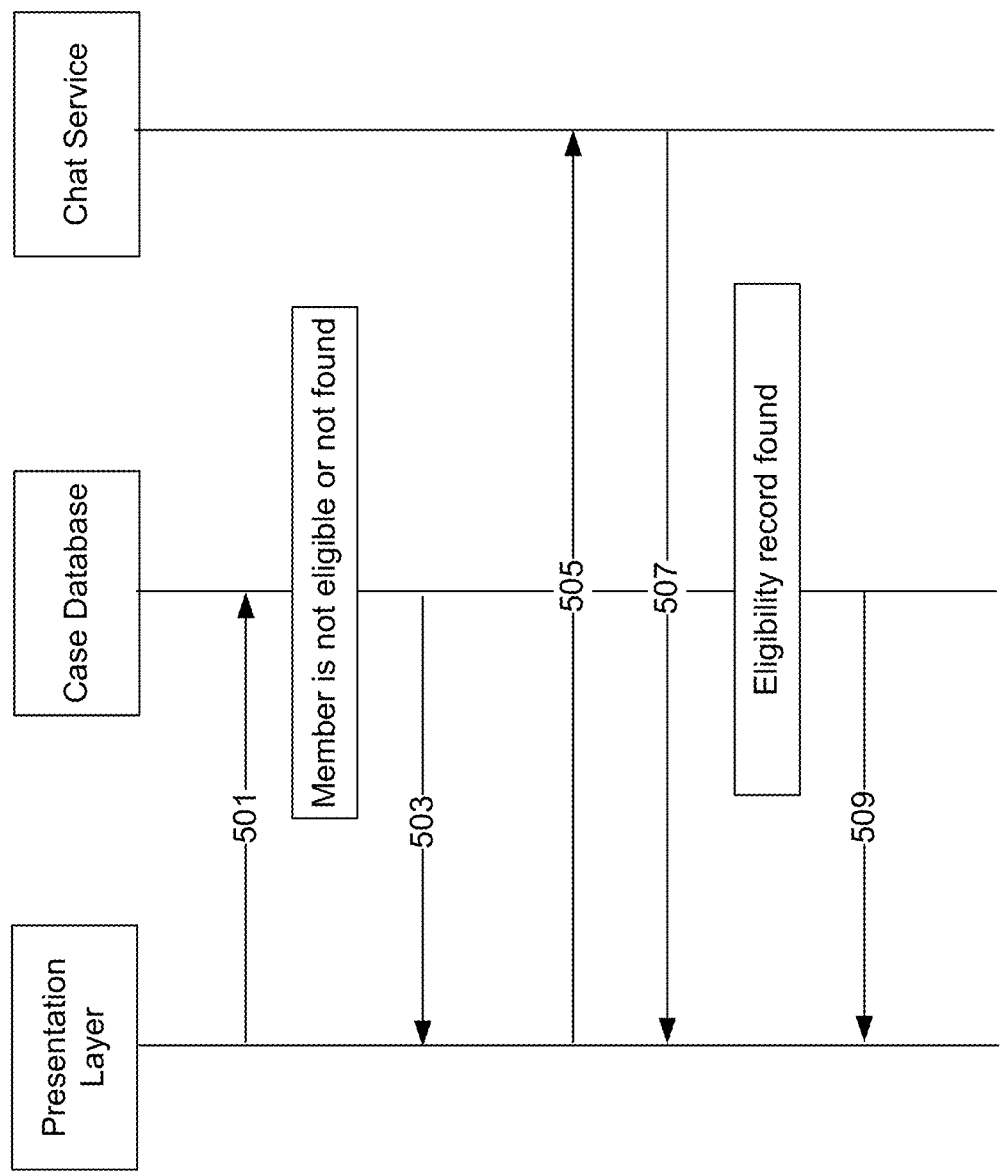
FIG. 5 shows a sequence diagram of establishing member eligibility via a chat service with a subrogation expert in accordance with one or more embodiments of the present technology.

In some cases, member's eligibility can be established by providing additional evidence to a subrogation expert for review. FIG. 5 shows a sequence diagram of establishing member eligibility via a chat service with a subrogation expert in accordance with one or more embodiments of the present technology. At operation 501, an attorney checks the eligibility of a client via the presentation layer. However, the case database indicates that the client is not eligible, or the record is not found. The attorney receives a corresponding response at operation 503. The attorney then initiates, at operation 505, a chat session with a subrogation expert to provide evidence of eligibility. Based on the evidence, the expert provides, at operation 507, a response to the attorney via the chat service. If the expert is able to locate the eligibility record or establish the member eligibility, the case database is updated accordingly. The platform then sends a notification 509 to the attorney indicating that the member is eligible.

Case Creation

As shown in FIG. 3, case creation is initiated by an attorney or insurance company adjuster (operation 301).

Figure 6:
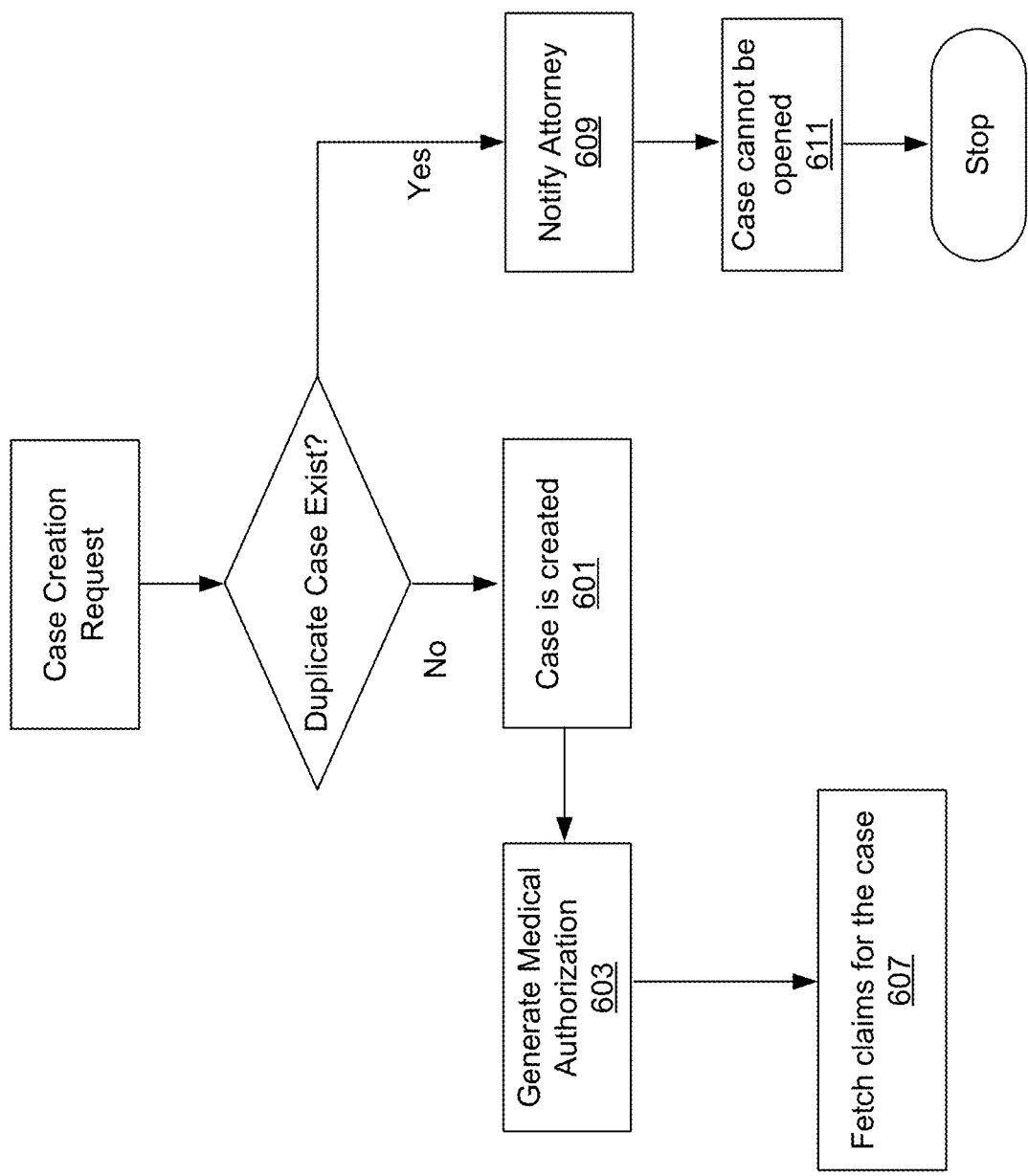
FIG. 6 is a flowchart representation of case creation in accordance with one or more embodiments of the present technology.

After determining that the member is eligible, the platform proceeds to handle the case creation request by processing information provided by the attorney or the insurance company adjuster. Information provided for creating a case includes, but not limited to, member injuries, attorney information, insurance information, and/or liable person(s). FIG. 6 is a flowchart representation of case creation in accordance with one or more embodiments of the present technology. The platform first checks for any existing case in the case database based on the provided information. If an existing case is not found, a case is created at operation 601. The platform generates medical authorizations at operation 603 and notifies the attorney that authorizations are ready. In some embodiments, the attorney can define search criteria to find claims that are related to the case. Based on the search criteria, claims are fetched from the claim database at operation 607 and are saved to the case database for future display in the user interface. Case information entered by the attorney is also saved to the case database. If a duplicate case is found, the platform notifies the attorney or the insurance company adjustor at operation 609. The platform also indicates, at operation 611, that a case cannot be opened.

Figure 7:
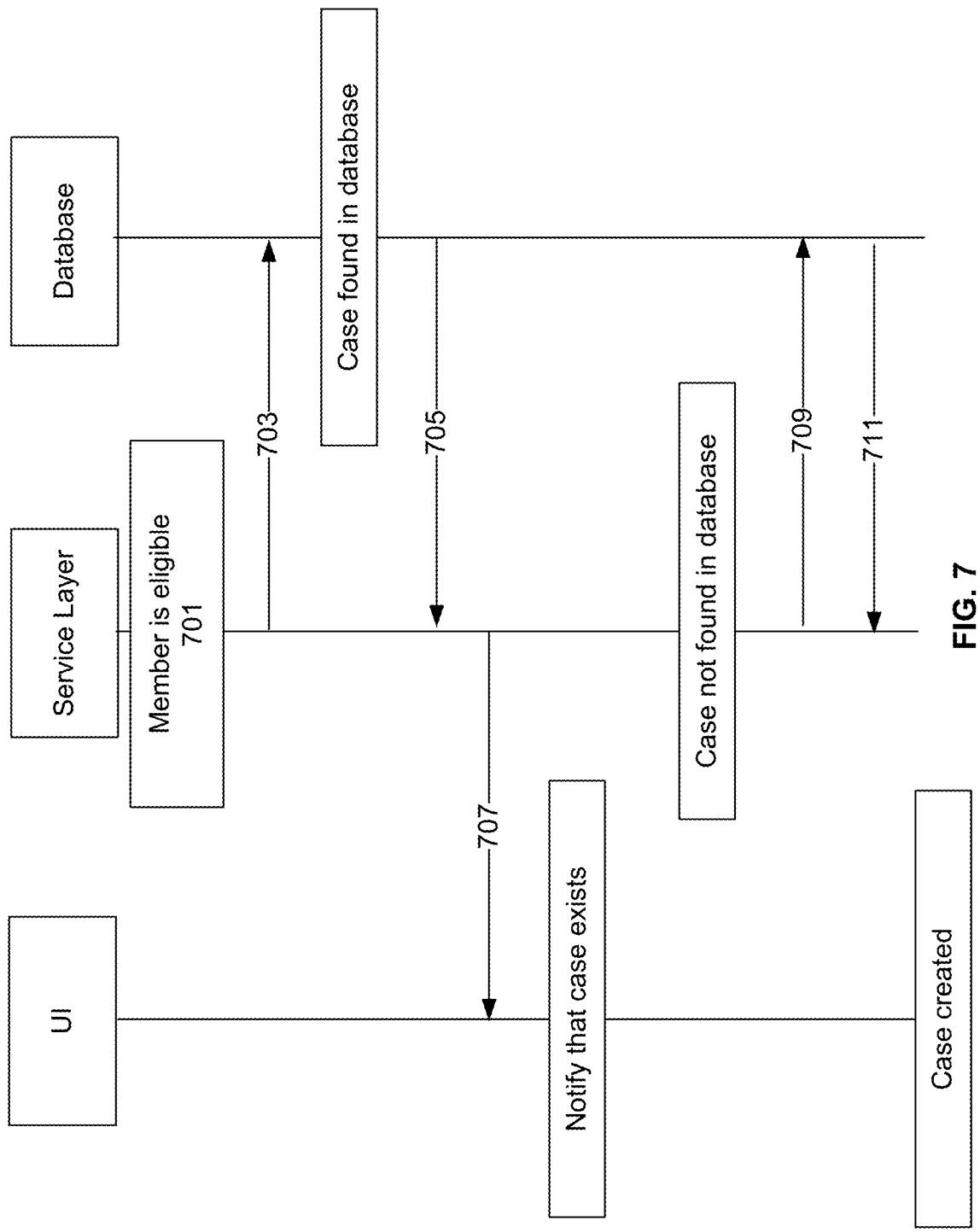
FIG. 7 is a sequence diagram of creating a case in the subrogation case management platform in accordance with one or more embodiments of the present technology.

FIG. 7 is a sequence diagram of creating a case in a subrogation case management platform in accordance with one or more embodiments of the present technology. After determining that the member is eligible at 701, the service layer checks the database, at 703, to see if the case already exists. If the case is found in the case database, then the database returns, at operation 705, case details indicating that a duplicate case exists. The service layer then reports, at operation 707, that there is an existing case. The UI then shows a message to notify the user. If the case is not found in the database, then a case is created and information regarding the case is stored in the database at operation 709. The database notifies the service layer, at operation 711, that the case has been created successfully. The UI subsequently indicates to the user that the case has been created.

Figure 8:
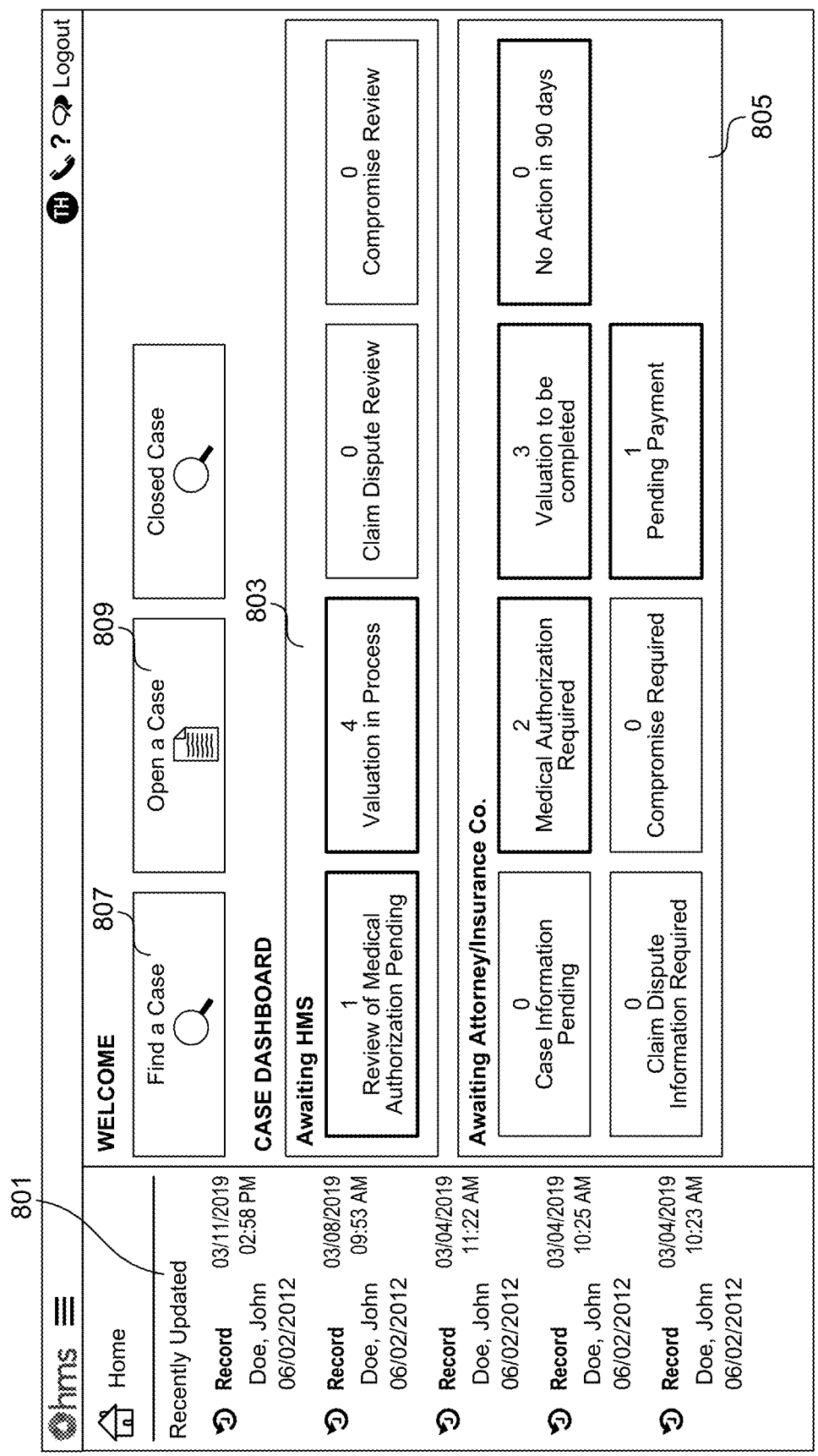
FIG. 8 is an example screenshot of a user interface that an attorney can view upon logging into the platform in accordance with one or more embodiments of the present technology.

FIG. 8 is an example screenshot of a user interface that an attorney can view upon logging into the platform in accordance with one or more embodiments of the present technology. The user interface—Dashboard—allows the attorney to see where the case is in the process. Cases that need actions by subrogation experts can be displayed in the middle section 803 of the Dashboard. For example, some of cases may not have a "full medical release authorization" and thus require a subrogation expert to review. For some cases, automated evaluation may not be feasible or accurate, and thus a subrogation expert may be involved. When the attorney disputes one or more paid medical claims, a subrogation expert needs to review the relevant documents before approving the dispute. Similarly, when the attorney submits a compromise request, a subrogation expert needs to review and approve/deny the compromise request before the attorney can proceed. Cases that need actions by the attorney or the insurance companies can be displayed in the bottom section 805 of the Dashboard. For example, a pending case may need information from the plaintiff's attorney. Some disputed cases may require additional information or documents to be uploaded by the attorney. As another example, a case may need payment from the insurance company. The left panel 801 of the Dashboard displays cases that the attorney recently created or updated. To search for a specific case, the attorney can click on "Find a Case" button 807 to enter search criteria. To create a new case, the attorney can click on "Open a Case" button 809 to enter information for a new case.

FIG. 9A is an example screenshot of a user interface showing member information provided for case creation in accordance with one or more embodiments of the present technology. In this example, the member address 901 is automatically populated. The attorney can modify this information without overwriting the original information received. In some embodiments, an address validation is performed by the platform by leverage third-party tools such as SmartStreets. To minimize data entry, once the zip code is entered, the platform will automatically populate city and state. Additionally, the platform checks for valid street addresses.

Figure 9B:
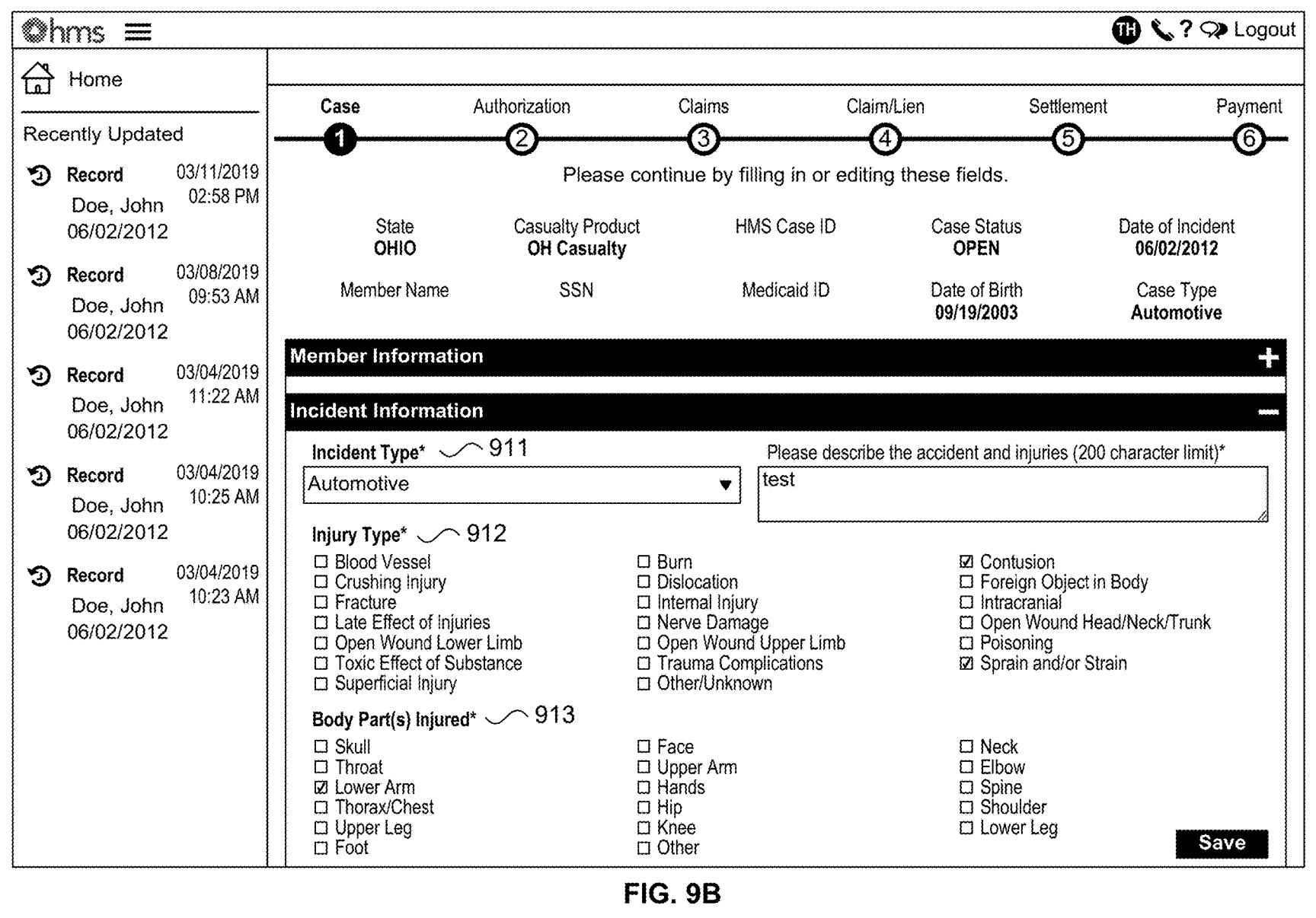

FIG. 9B is an example screenshot of a user interface showing incident information provided for case creation in accordance with one or more embodiments of the present technology. In this example, the attorney specifies the incident type 911, the injury type 912 and the injured body part(s) 913 before proceeding to provide other information.

Figure 9C:
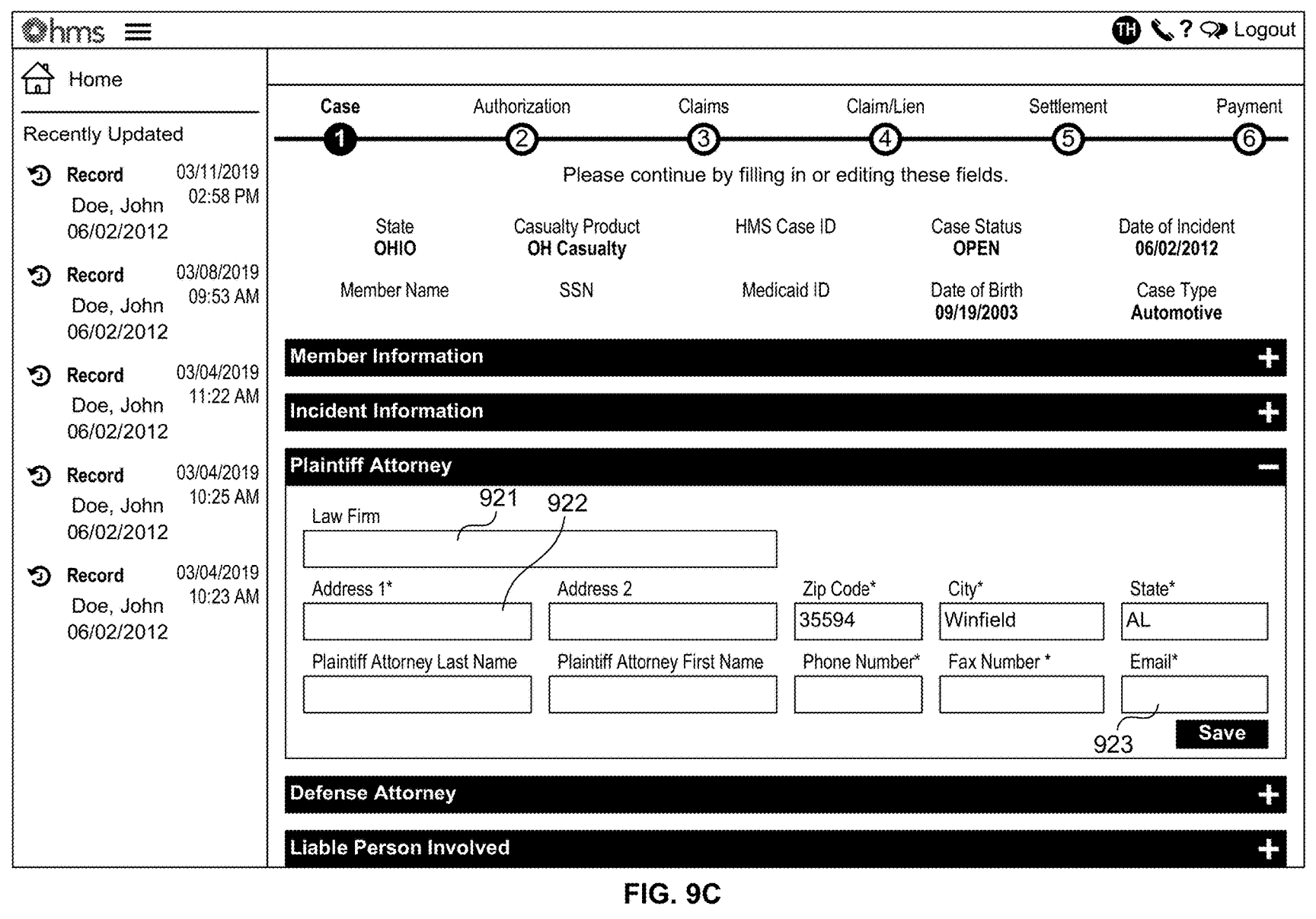
Figure 9D:
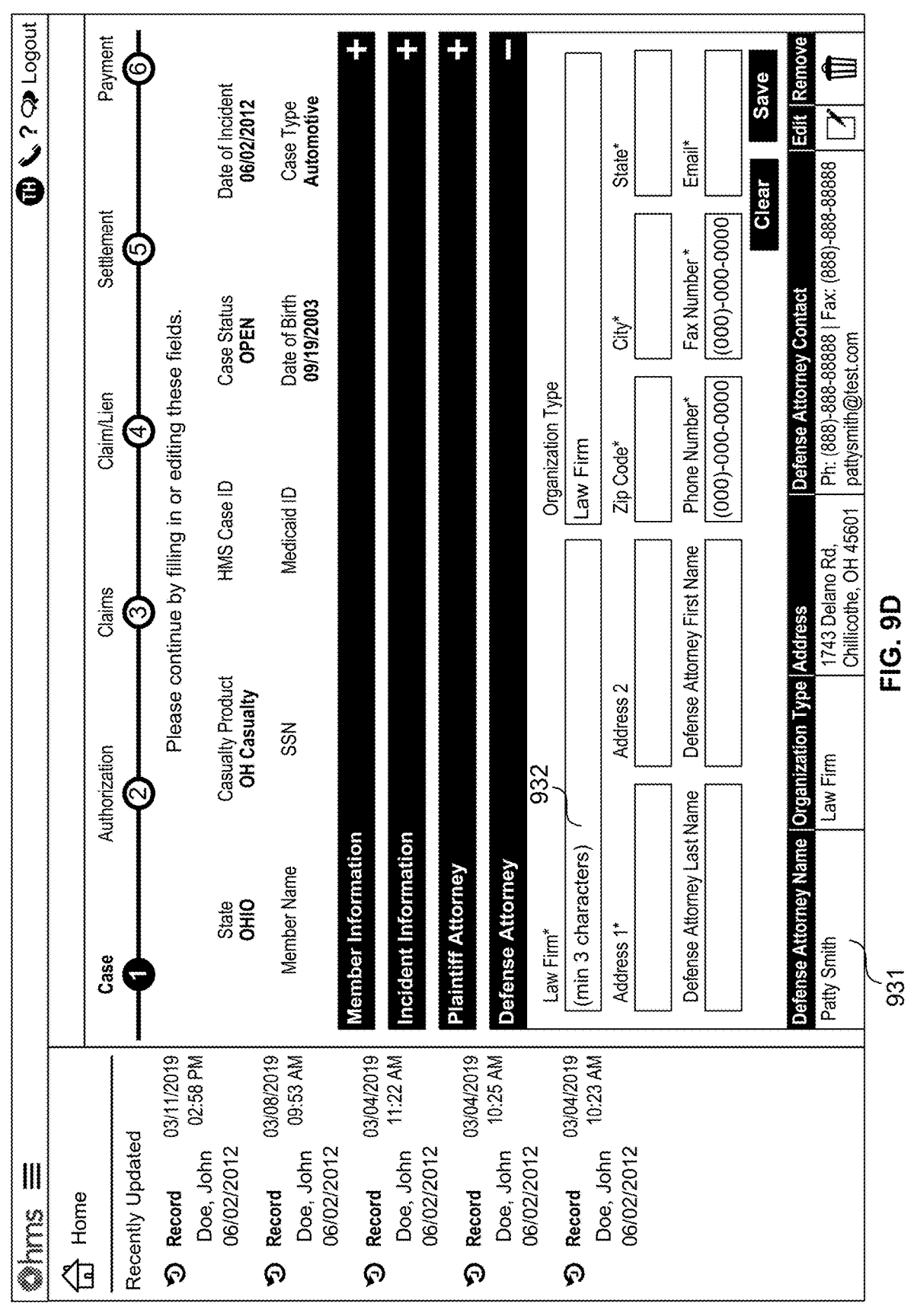

FIG. 9C is an example screenshot of a user interface showing plaintiff attorney information provided for case creation in accordance with one or more embodiments of the present technology. In this example, plaintiff attorney's information can be automatically populated, including but not limited to the name of the law firm 921, address 922, and email 923. FIG. 9D is an example screenshot of a user interface showing defense attorney information provided for case creation in accordance with one or more embodiments of the present technology. In order to minimize data entry, the platform can identify if there are any matches for defense attorneys previously added. The attorney who is creating the case can select a record that already exists 931 or enter a new record 932. Multiple defense attorneys can be associated to the case.

Figure 9E:
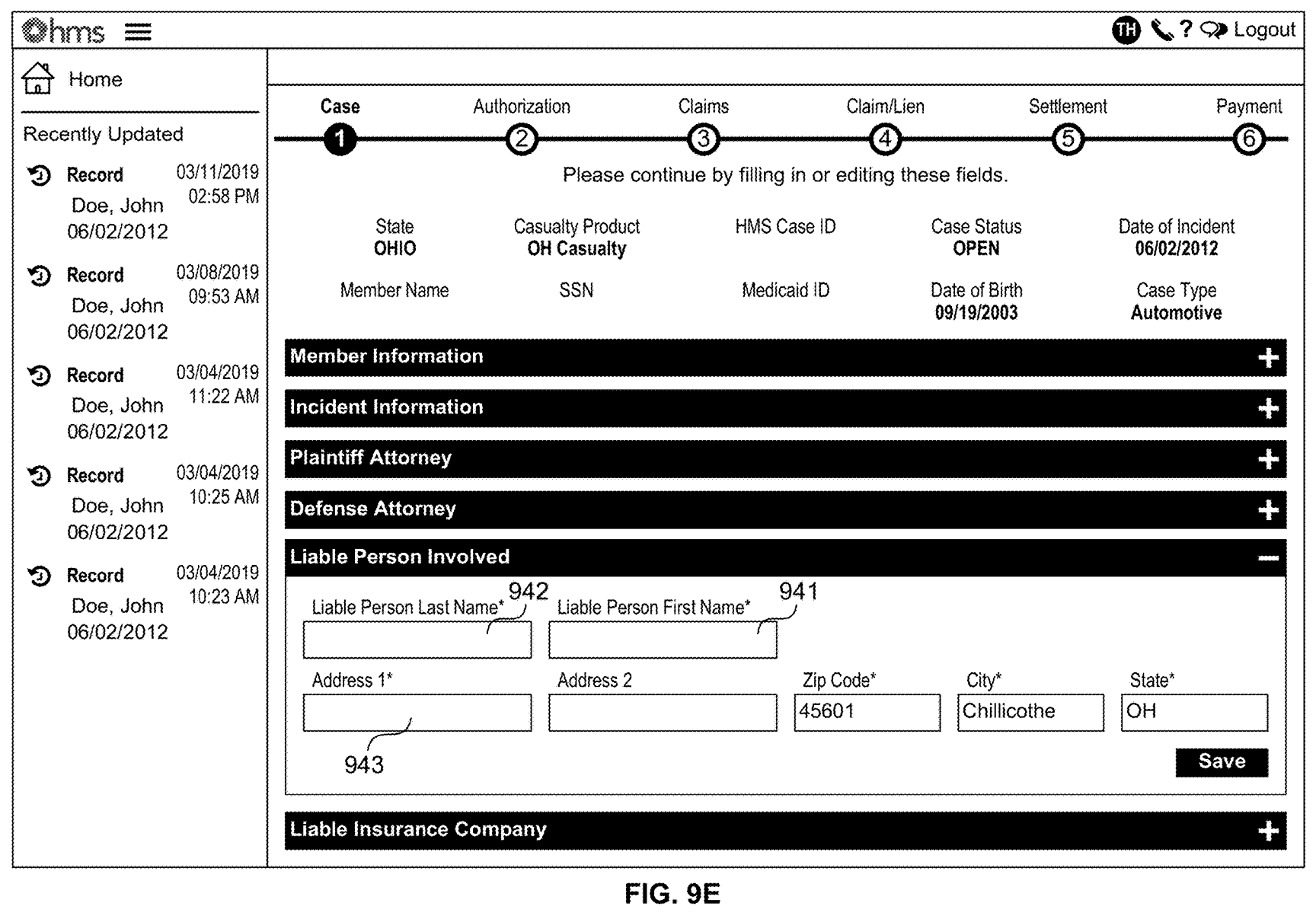

FIG. 9E is an example screenshot of a user interface showing liable person information provided for case creation in accordance with one or more embodiments of the present technology. The attorney can manually enter information about the liable person, such as the first name 941, the last name 942, and the address 943.

Figure 9F:
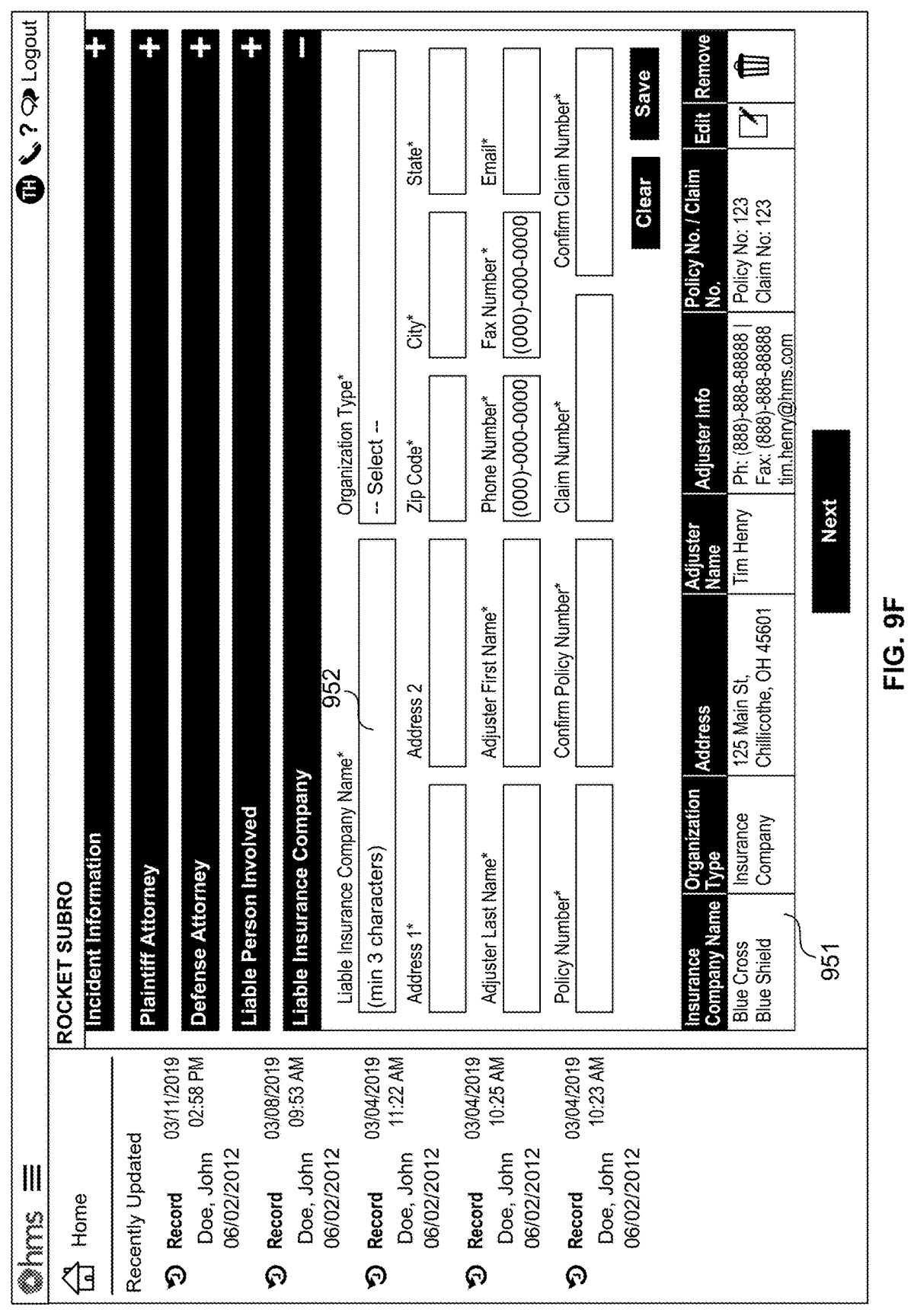

FIG. 9F is an example screenshot of a user interface showing liable insurance companies provided for case creation in accordance with one or more embodiments of the present technology. In order to minimize data entry, the platform identifies if there are any matches for liable insurance company and adjuster previously added. The attorney who is creating the case can select a record that already exists 951 or enter a new record 952. Multiple liable insurance companies can be associated to the case.

Medical Authorization

Detailed medical claims form an essential part of a subrogation case. However, under the currently regulation such as the Health Insurance Portability and Accountability Act of 1996 (HIPAA), the medical claims require authorization from the member so that the they can be released to third parties. A subrogation case management platform can provide multiple types of medical authorizations to allow an attorney to gain access to a party's detailed medical claims. For example, in some embodiments, the platform provides full medial authorizations and partial medical authorizations. A full medical authorization allows the attorney to have a complete review of the detailed medical claims. This is required, for example, when an affirmative authorization is needed for an underlying cause that is related to substance abuse or AIDS. A partial medical authorization allows the attorney to have limited knowledge of the detail medical claims—past history related to AIDS treatment or substance abuse rehabilitation is excluded or is limited to a specific time period.

Figure 10:
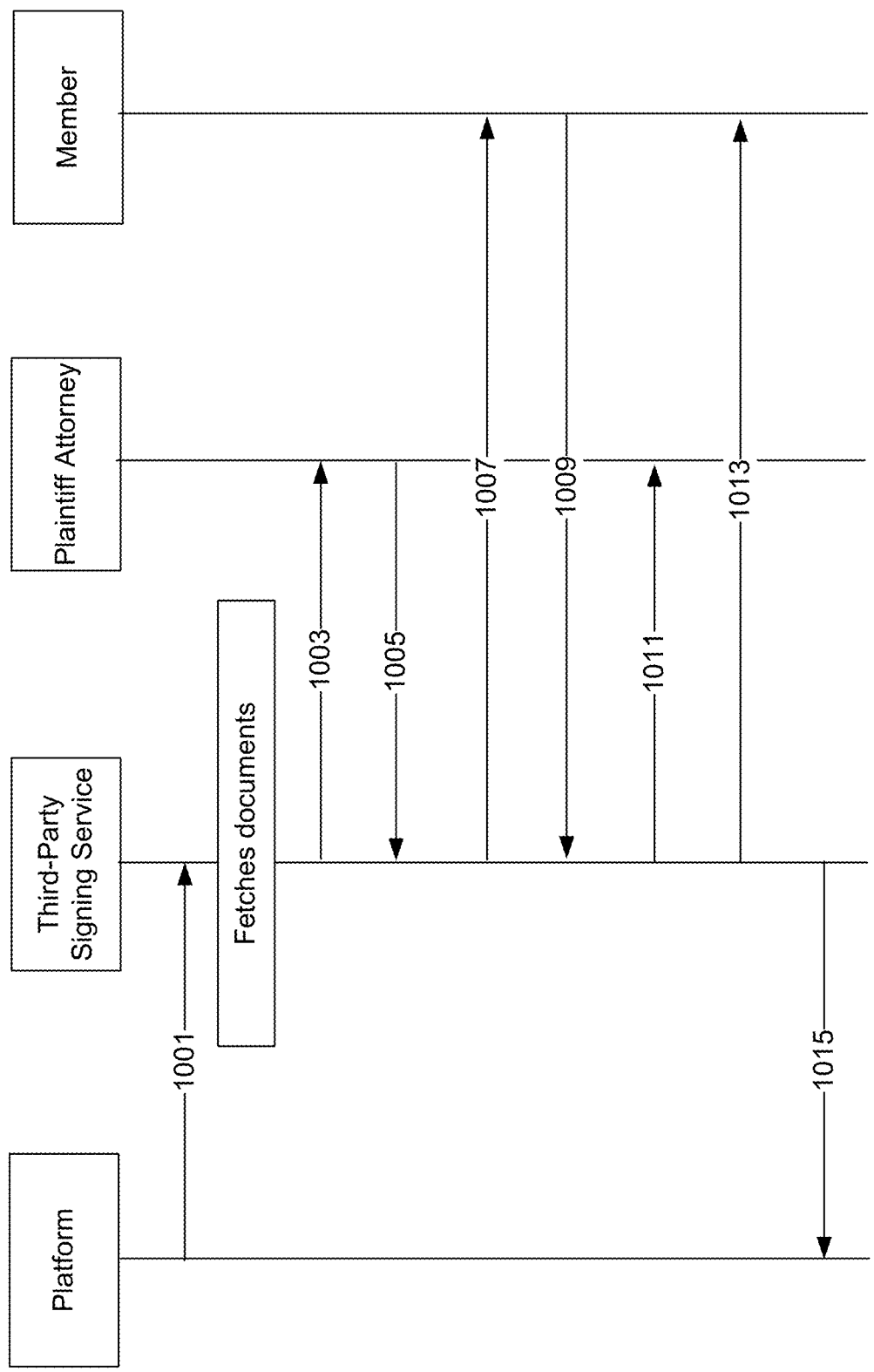
FIG. 10 shows a sequence diagram of an example medical authorization process in accordance with one or more embodiments of the present technology.

After creating a new case and before viewing the detail paid claims, the attorney can submit a medical authorization request as required by HIPAA. FIG. 10 shows a sequence diagram of an example medical authorization process in accordance with one or more embodiments of the present technology. The platform sends a member authorization request to a third-party signing service at operation 1001. The third-party signing service fetches the required documents and sends the documents to plaintiff attorney at operation 1003 for review. The plaintiff attorney can verify and add additional information to the authorization documents (e.g., to add comments, indicate release type and/or expiration date, etc.). Once the attorney verifies the document, the third-party service receives a confirmation from the attorney at operation 1005. The third-party service then sends the documents, at operation 1007, to the member for his/her review and signature.

Once the member has reviewed and signed authorization documents, a notification is sent back, at operation 1009, to the third-party signing service. The third-party signing service sends a notification (e.g., an email) to the attorney at operation 1011 and a notification (e.g., an email) to the member at operation 1013, indicating that the authorization document is now complete. The third-party signing service also sends a notification to the platform at operation 1015 to indicate that authorization has been completed. If it is not a full authorization, then a subrogation case expert will review the authorization before the attorney can proceed.

Figure 11:
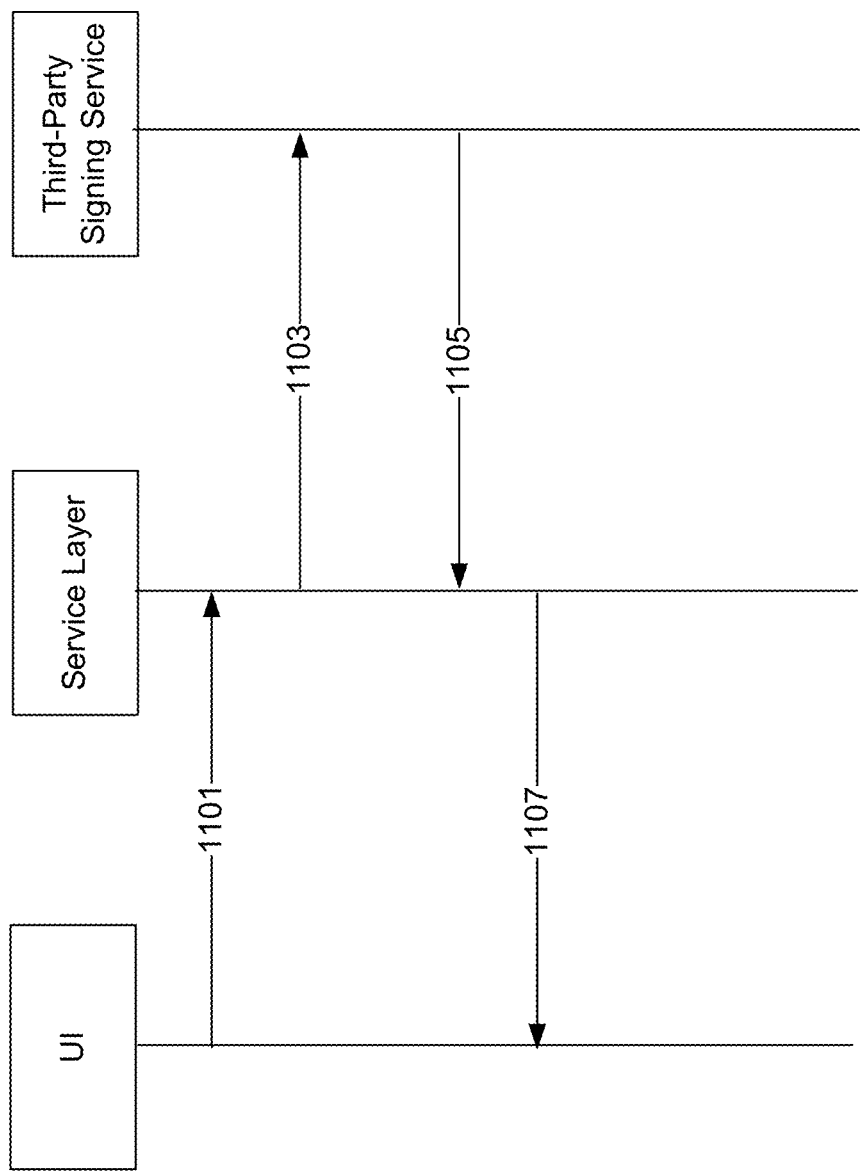
FIG. 11 shows another sequence diagram of an example authorization process in accordance with one or more embodiments of the present technology.

FIG. 11 shows another sequence diagram of an example authorization process in accordance with one or more embodiments of the present technology. An attorney initiates, at operation 1101, an authorization request from the UI. The service layer sends the member authorization documents to the attorney for review and verification at operation 1103 via a third-party signing service. After the documents are verified by the attorney, they are forwarded to the member for signature. Once the service layer receives the complete and executed authorization at operation 1105 from the third-party service, the service layer indicates in the UI at operation 1107 that the authorization has been completed.

FIG. 12 is an example screenshot of a user interface showing an authorization form in accordance with one or more embodiments of the present technology. In some embodiments, a drop-down menu 1201 gives the attorney the option of submitting the medical authorization manually or electronically. Manually submitted authorization requests will go to a subrogation expert for review, while the electronically submitted requests are handled automatically by the platform. In some embodiments, the attorney can perform the following operations in generating the medical authorization:

Operation 1: The attorney previews medical authorization forms via the Dashboard.

Operation 2: The attorney generates medical authorization forms upon the completion of reviews.

Operation 3: After the medical authorization forms are generated, the platform sends an email (e.g., via a third-party signing service) to the attorney to enter any remaining required information. For example, under the HIPPA, an expiration date or event of the authorization is required. Thus, the email asks the attorney to specify the expiration date or event for the case. Based on the entered information on the form, the platform determines whether the authorization is a full authorization or a partial authorization. If the completed form indicates that it is a full authorization, then the case can move onto the next stage once the authorization is signed by the member. If the completed form indicates that it is a partial authorization, then the medical authorization needs to be reviewed by a subrogation expert before the case can proceed. If the medical authorization expires, claims will no longer be available in the Dashboard, and the attorney will need to submit a new valid medical authorization in order to proceed beyond the authorization stage.

Operation 4: The platform sends the authorization forms that are completed by the attorney to the member's email address. The member then signs the authorization.

Operation 5: Once the medical authorization is fully executed, the attorney can proceed to the next operation of the case: claim valuation and claim/lien generation.

Claim Valuation and Claim/Lien Generation

Figure 13:
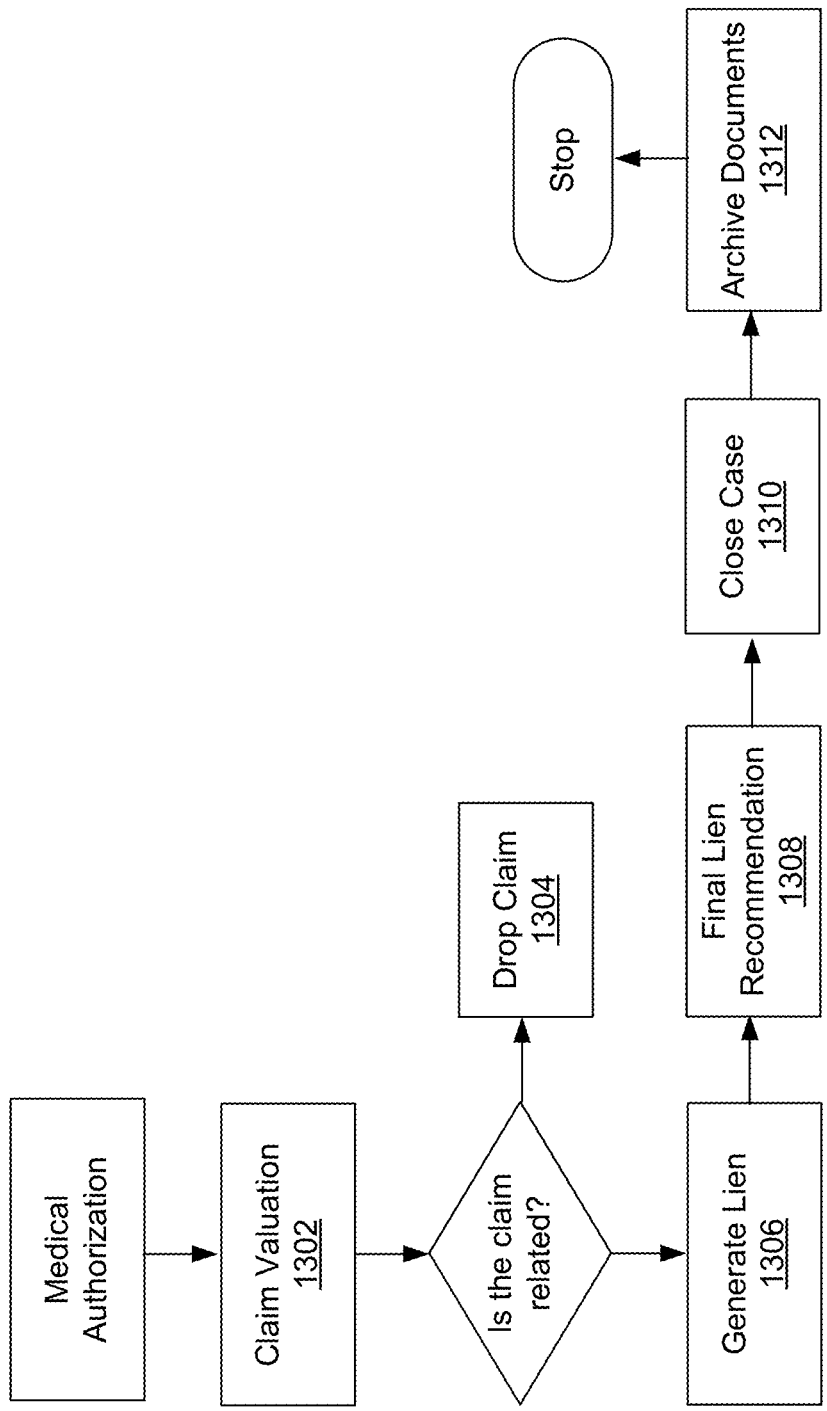
FIG. 13 is a flowchart representation of an example claim valuation and lien generation process in accordance with one or more embodiments of the present technology.

FIG. 13 is a flowchart representation of an example claim valuation and claim/lien generation process in accordance with one or more embodiments of the present technology. After the medical authorization is executed and confirmed valid, the platform proceeds to perform claims valuation at operation 1302 to determine if the claims are related to the case. If a claim is not related, in some embodiments, the platform drops the claim from the case at operation 1304. The platform then generates claim/lien amount based on the related claims at operation 1306 and provides a final claim/lien recommendation (FLR) at operation 1308. After parties settle the case and the final claim/lien amount is paid, the case can be closed at operation 1310. In some embodiments, relevant documents can be archived at operation 1312. The attorney can be notified about progress of the case at each stage via Dashboard.

The medical history of the member can be complex—past diagnosis may not be necessarily related to the case. Conventionally, a subrogation expert manually determines whether a medical claim is related to the case. This process can be time consuming. The platform can analyze relevant claim information, such as injury type and/or injured body part(s), to automatically determine the probability of whether a medical claim is related to the case, thereby reducing case processing time and providing more flexibility to the attorney.

Figure 14:
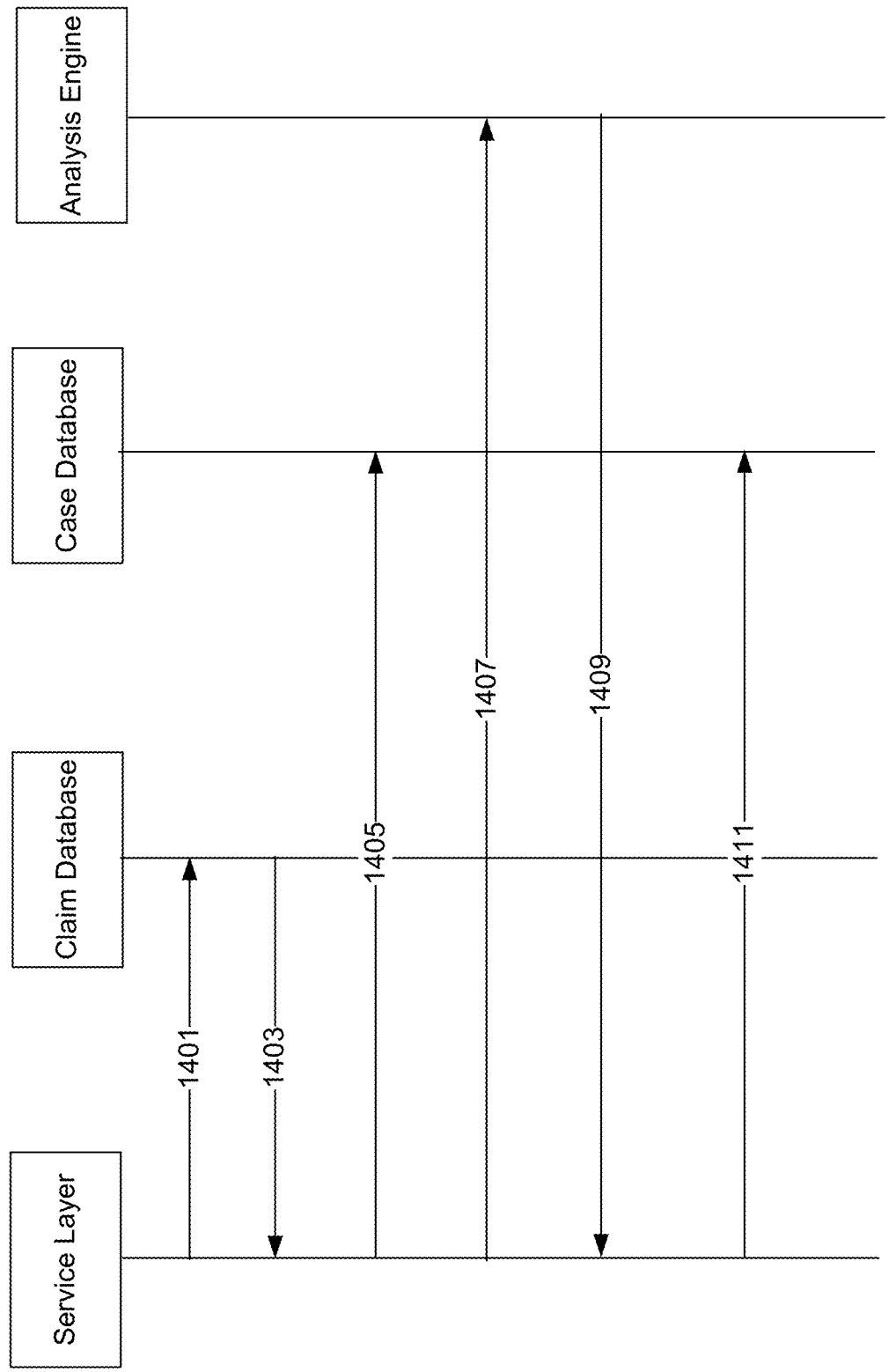
FIG. 14 is a sequence diagram of an example claim matching process in accordance with one or more embodiments of the present technology.

FIG. 14 is a sequence diagram of an example claim matching process in accordance with one or more embodiments of the present technology. As shown in FIG. 14, the service layer fetches claim information from the claim database at operation 1401. After the claim database returns claim information at operation 1403, the service layer stores the claim information into the case database at operation 1405. The service layer also requests the claim probability scores indicating whether the claims are related to the case from the analysis engine at operation 1407. The engine returns the probability scores at operation 1409, and the service layer updates the claim database with the probability scores at operation 1411.

Figure 15A:
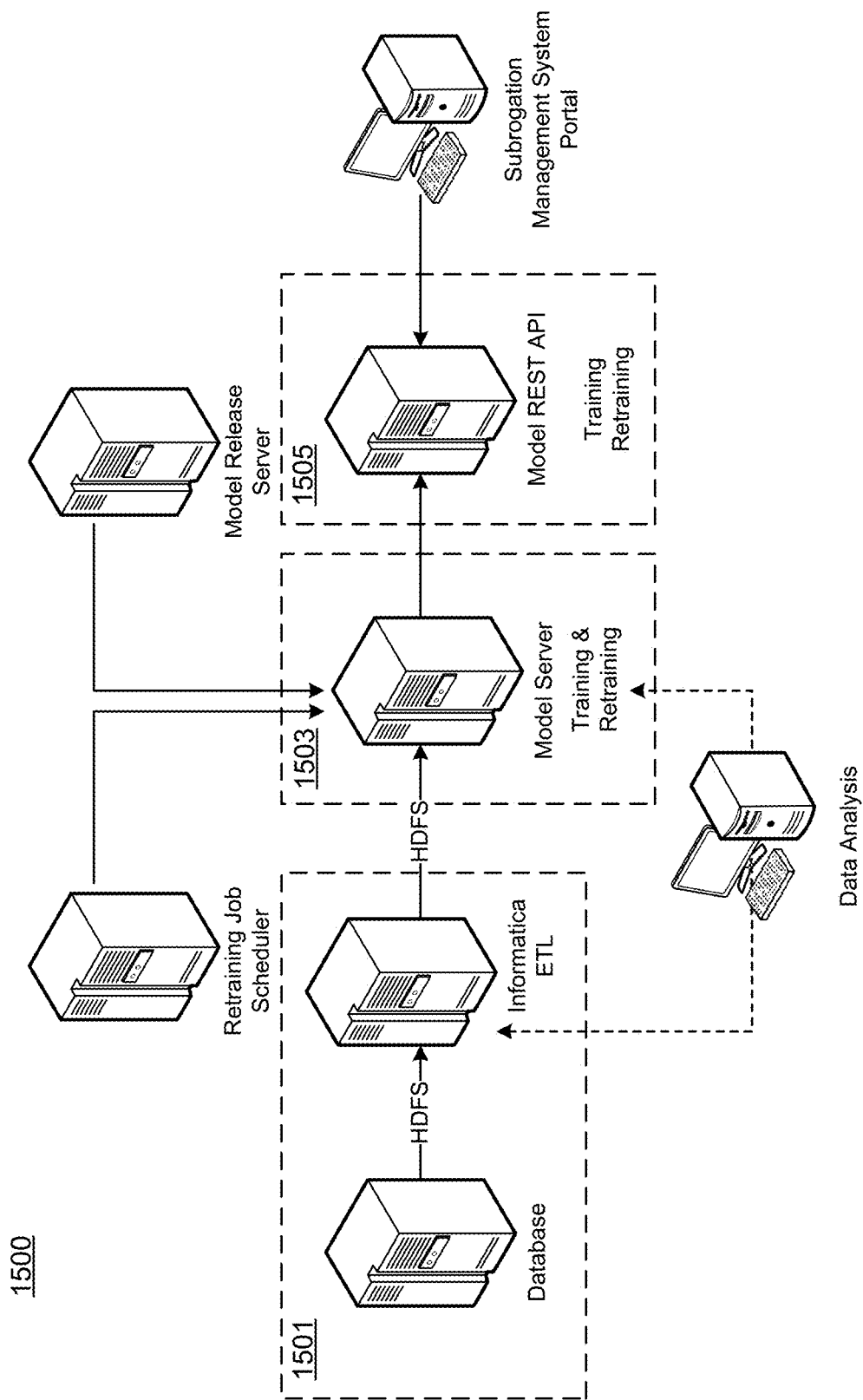
FIG. 15A illustrates an example architecture of an artificial intelligent (AI) system for training and determining claim probability scores in accordance with one or more embodiments of the present technology.

In some embodiments, the analysis engine can be implemented using an artificial intelligence (AI) system. FIG. 15A illustrates an example architecture of an AI system 1500 for training and determining claim probability scores in accordance with one or more embodiments of the present technology. The AI system 1500 includes three major components: data acquisition 1501, model training 1503, and model Representational State Transfer (RESTful) interface and retraining 1505. In the data acquisition component 1501, data for a selected period (e.g., last three years) is exported from the database to Informatic Extract, Transform, and Load (ETL) process. Informatica ETL extracts the features needed for the claim valuation model and the FLR model, and exports data to separate claim valuation and FLR data files. In the model training component 1503, a model server performs separate trainings for the claim valuation model and the FLR model. The model server reads the exported data files from Informatica ETL and performs training according to one or more training transcripts. After training is completed for the claim valuation model and/or the FLR model, model files are created or updated.

Figure 15B:
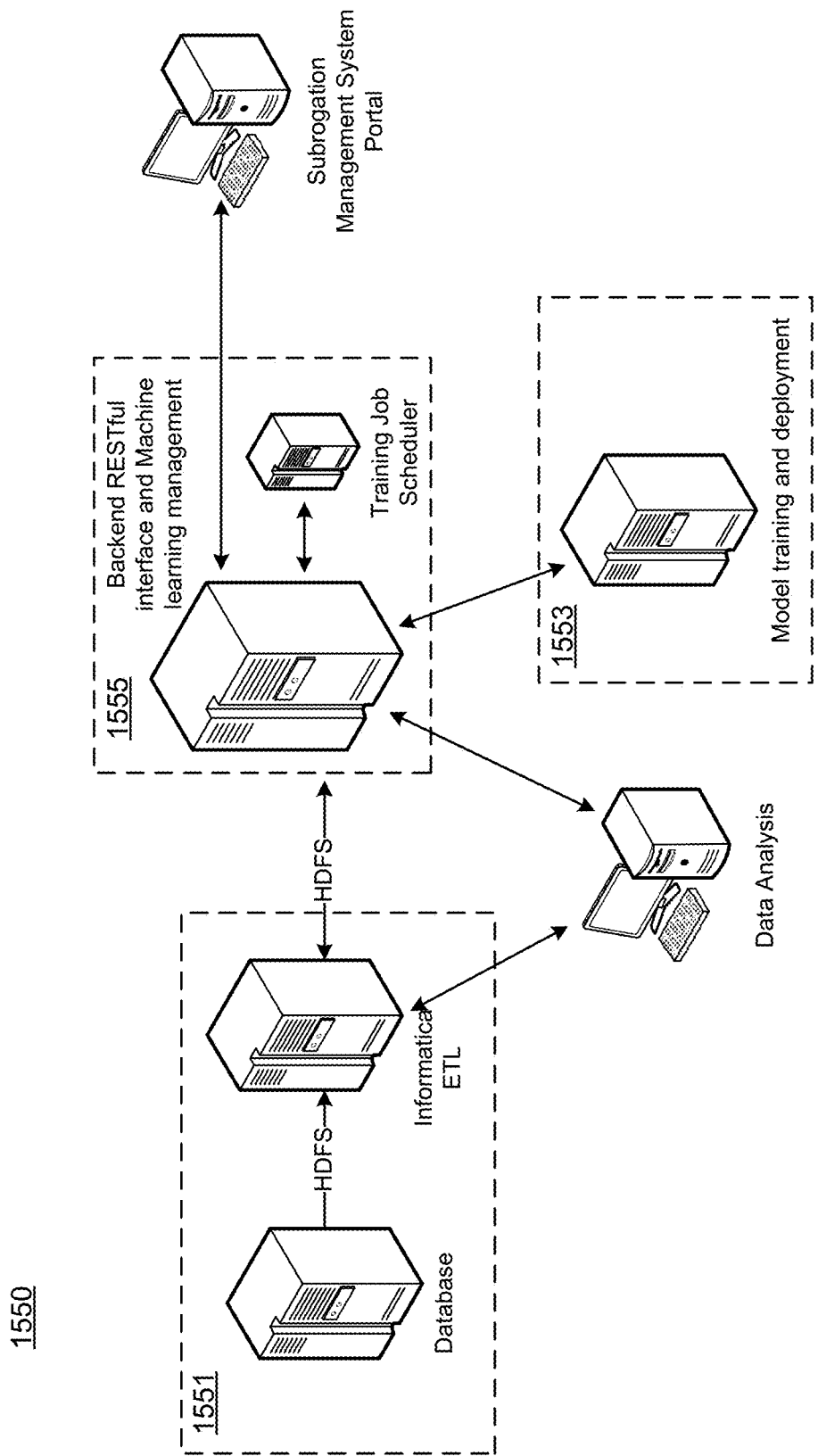
FIG. 15B illustrates another example architecture of an artificial intelligent (AI) system for training and determining claim probability scores in accordance with one or more embodiments of the present technology.

FIG. 15B illustrates another example architecture of an AI system 1550 for training and determining claim probability scores in accordance with one or more embodiments of the present technology. This system 1550 includes data acquisition component 1551, model training and deployment component 1553, and backend Representational State Transfer (RESTful) interface and machine learning management component 1555. In this example, the deployment functionality is co-located with the training functionality in the model training and deployment component 1553. In some embodiments, an augmented machine learning server (also referred to as DataRobot) performs separate trainings for the claim valuation model and the FLR model. Upon determining that the trained models achieve a predefined level of accuracy, the models can be deployed directly. In some embodiments, a retraining job scheduler can be implemented in the backend RESTful interface and machine learning management component 1555 to schedule retraining accordingly.

Once the training is completed, the model REST interface receives requests from the subrogation management system portal for probability values. The model REST interface executes an inference process by reading the generated claim valuation or FLR model files. After the inference process is completed, the model REST interface sends a list of probability values back to the portal. To maintain a high level of accuracy, the models are retrained periodically using a retraining job scheduler. The retraining job scheduler runs the automated retraining job at a pre-configured timing (e.g., on quarterly basis). The resulting retraining reports can be examined by a subrogation expert to determine if the newly retrained model should be submitted for release. During the model release process, old trained model is backed up and newly trained model is deployed to be used for live inferences.

Relatedness Probability

To obtain the relatedness probability, the claim valuation model can be trained using techniques such as supervised training to classify related claims from unrelated claims. Conventional classification problems use algorithms such as logistic regression, naive Bayes classifier, Support Vector Machines (SVM), decision trees, and/or random forest. However, these algorithms generally underperform when there are multiple or non-linear decision boundaries. They are not flexible enough to capture more complex relationships and patterns as are present in medical claims. Also, large number of patterns and trees can make traditional algorithms slow during training and inference. Most conventional algorithms build decision tress independently, which can lead to a higher chance of overfitting. There are also a limited number of fine tune options to achieve further accuracy.

Gradient boosting, a machine learning technique for regression and classification problems, can be used to produce a prediction model for determining relatedness of a claim. As compared to conventional algorithms, gradient boosting algorithms build trees one at a time. Each new tree helps correct errors made by previously trained tree. In other words, subsequent trees help boost previously weak models to strong ones, resulting in higher accuracy when there is a large variation in the training dataset. Gradient boosting evaluates the accuracy of model while iterating through the boosting process. Furthermore, gradient boosting strengthens the impact of the positive class or the negative class, leading to more accurate results with unbalanced training datasets. Example setup parameters of the claim valuation model using gradient boosting algorithms are shown as follows:

```
params = {
    'objective' : 'binary:logistic', # Binary Classification
    'max_depth' : 5, # Maximum depth of a tree.
    'learning_rate' : 0.1, # Boosting learning rate
    'n_estimators' : 1000, # Number of boosted trees to fit
    'n_jobs' : 4, # Number of parallel threads
    'min_child_weight' : 1, # Minimum sum of instance weight needed in a child
    'subsample' : 0.8, # Subsample ratio of the training instance
    'colsample_bytree' : 0.8, # Subsample ratio of columns when constructing each tree.
    'scale_pos_weight' : 1, # Balancing of positive and negative weights
    'random_state' : 27, # Random number seed
    'tree_method': 'exact' # Tree construction algorithm
}
```

The parameter 'n_estimator' is be used to define the optimized number of trees/rounds for valuation. Sometimes, more than 80% of the claims in the training dataset are non-related claims. Based on the number of unrelated claims, the parameter 'scale_pos_weight' can be used to add a bias to increase prediction accuracy for the related claims. In some embodiments, the parameter 'learining_rate' can be used to fine tune the model for increased accuracy.

Figure 16:
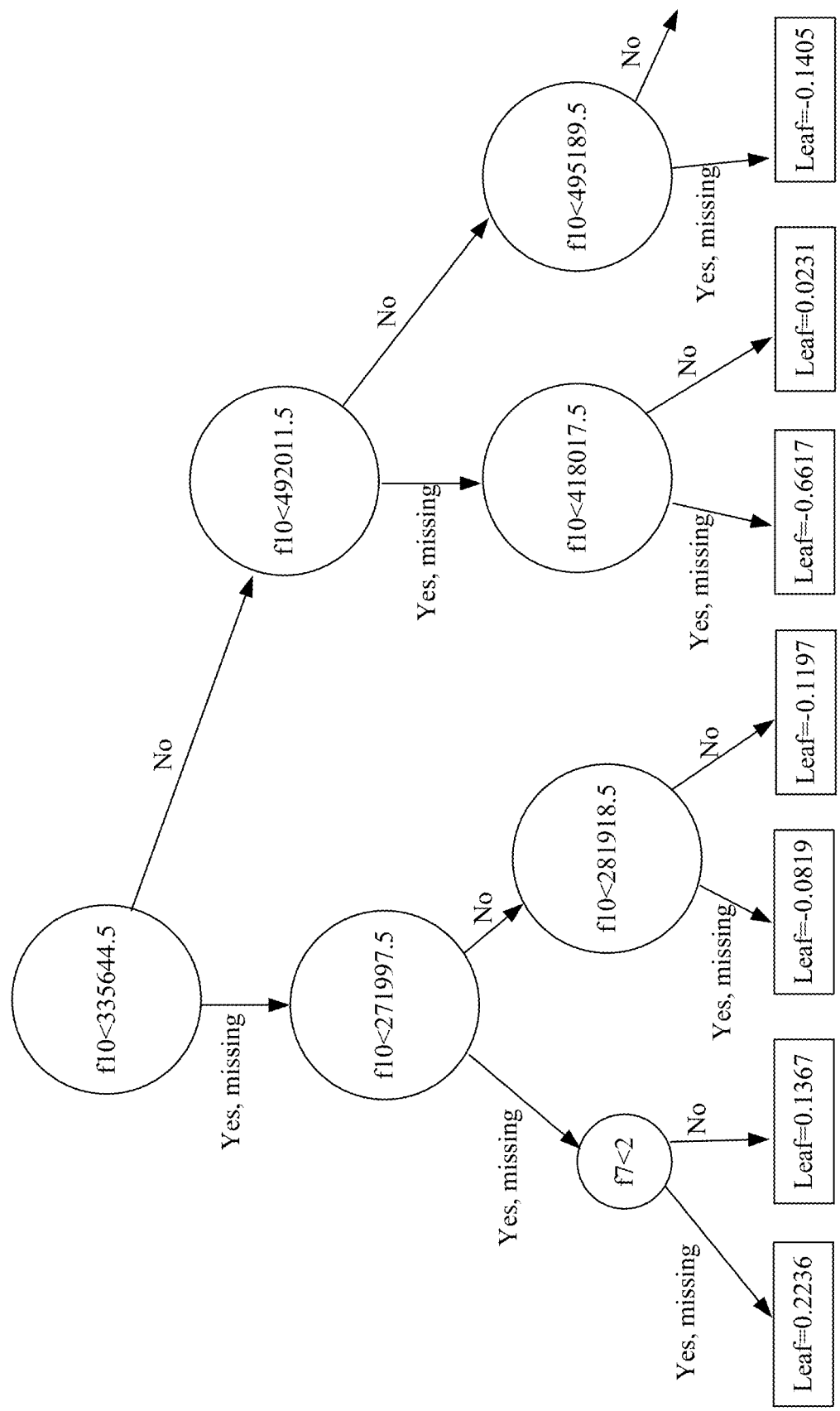
FIG. 16 shows an example section of a decision tree of a claim valuation model in accordance with one or more embodiments of the present technology.

FIG. 16 shows an example section of a decision tree of a claim valuation model in accordance with one or more embodiments of the present technology. In some embodiments, multiple tress can be constructed in parallel to achieve faster computing speed.

Table 1 shows an example of input fields for relatedness probability training and determination. In some embodiments, all the input fields are used in the training. In some embodiments, a subset of the fields is selected for training.

TABLE 1

An example of input fields for relatedness probability training and determination

| Input | Description |
|---|---|
| 1. seq_id: | Sequence identifier for each claim |
| 2. context_cd: | Context identifier |
| 3. case_type_cd: | Case type identifier |
| 4. head_ind: | Set value as "1" if injury description indicates head injury |
| 5. back_ind: | Set value as "1" if injury description indicates back injury |
| 6. body_ind: | Set value as "1" if injury description indicates body/torso injury |
| 7. hip_ind: | Set value as "1" if injury description contains one of the following strings |
| 8. leg_ind: | Set value as "1" if injury description contains one of the following strings |
| 9. arm_ind: | Set value as "1" if injury description contains one of the following strings |
| 10. age: | Actual patient's age at the time of the Medicare services |
| 11. gender: | Patient's gender |
| 12. days: | Number of days since incident |
| 13. ICD9D_RF: | List of all Internal Classification of Diseases 9 (ICD9) and ICD10 diagnosis codes associated with the current claim. |
| 14. NDCCD_RF: | Drug code associated with the current claim. |
| 15. ICD9P_RF | List of all the Current Procedural Terminology (CPT), Healthcare Common Procedure Coding System (HCPCS), or Revenue codes (ICD9 and ICD10) associated with the current claim. |

In some embodiments, the claim valuation model is trained through multiple epochs. An epoch is a measure of the number of times all of the training vectors are used once to update the weights. In some embodiments, the training process provides an early stop option to stop the training when no further improvement is monitored.

In some embodiments, the full data set provided by Informatica ETL (as shown in FIG. 15) is divided into two parts: a first subset of the data (e.g., 60%) is used for training, and a second subset of the data (e.g., 40%) is used for verification of the training accuracy.

Figure 17:
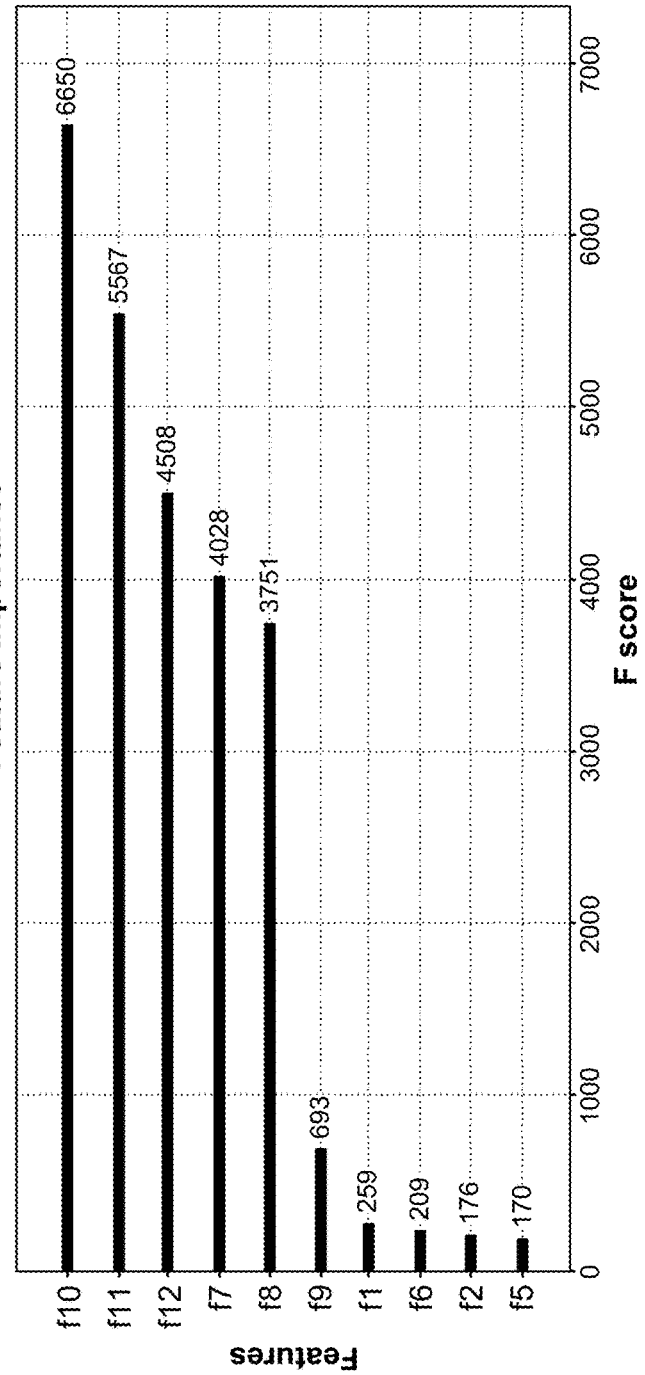
FIG. 17 is a chart illustrating several important features in an example claim valuation training process in accordance with one or more embodiments of the present technology.

FIG. 17 is a chart illustrating several important features in an example claim valuation training process in accordance with one or more embodiments of the present technology. As shown in FIG. 17, input fields such as procedural codes, drug codes, diagnosis codes, age, and number of days since incident are important features for an accurate prediction model.

Figure 18:
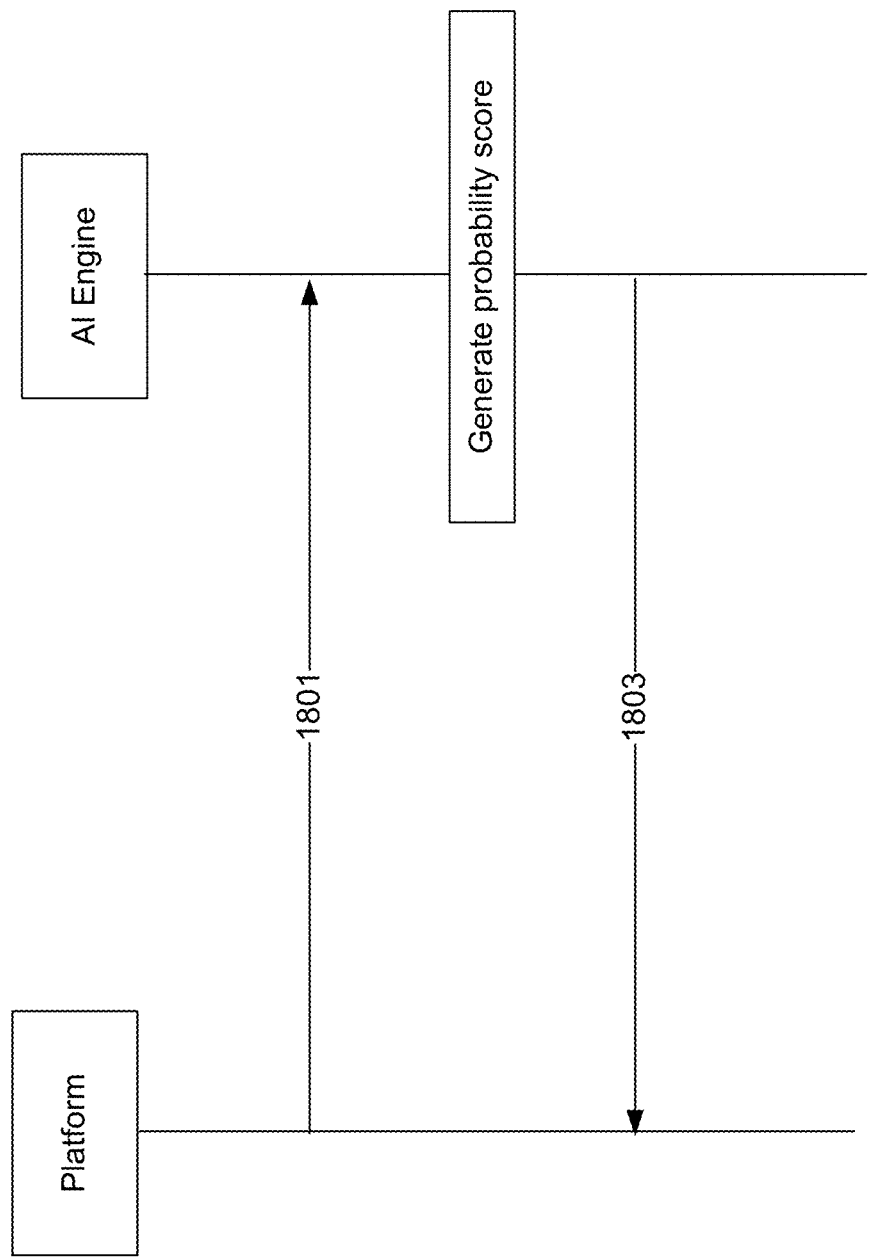
FIG. 18 is an example sequence diagram of retrieving claim probability scores in accordance with one or more embodiments of the present technology.

Once the model is trained and deployed, the subrogation case management platform can obtain probability values for claim relatedness determinations. FIG. 18 is an example sequence diagram of retrieving claim probability scores in accordance with one or more embodiments of the present technology. The subrogation case management platform can request, at operation 1801 via the REST interface, details about the claim including the relatedness probability. The AI engine executes an inference process based on the claim evaluation model to generate a list of relatedness probability values for the claims. The AI engine then sends the probability values back to the platform at operation 1803.

FIG. 19 illustrates an example screenshot of a user interface showing claim relatedness in accordance with one or more embodiments of the present technology. Instead of requiring a subrogation expert to manually determine the relatedness of each claim, the platform compares the probability values it receives from the AI engine to a predefined threshold (e.g., 50%) to determine whether some of the claims are related. As shown in FIG. 19, in this example the claim is automatically determined to be related to the case by the platform.

In some embodiments, the attorney may dispute a claim that was determined to be related by the platform. FIG. 20 illustrates another example screenshot of a user interface showing a claim relatedness dispute in accordance with one or more embodiments of the present technology. The attorney can change the "Related?" button 2001 from "YES" to "NO" and enter claim dispute comments 2003. The attorney can upload supporting documentation for the dispute. The claim disputes are then reviewed by caseworker for validity to prevent attorneys from eliminating claims that are actually related to the case.

Final Lien Recommendation

Similar to relatedness probability, the training of the FLR determination can be implemented using supervised training. For example, gradient boosting can be used to produce a prediction model for determining FLR based on data from a selected period of time (e.g., previous three years). The model generates a probability that indicates if all the related claims in a case have been received and no further related claims are expected at the time. Example setup parameters of the FLR model are shown as follows:

```
params = {
        'objective' : 'binary:logistic', # Binary Classification
        'max_depth' : 5, # Maximum depth of a tree.
        'learning_rate' : 0.1, # Boosting learning rate
        'n_estimators' : 1000, # Number of boosted trees to fit
        'n_jobs' : 4, # Number of parallel threads
        'min_child_weight' : 1, # Minimum sum of instance weight needed in a child
        'subsample' : 0.8, # Subsample ratio of the training instance
        'colsample_bytree' : 0.8, # Subsample ratio of columns when constructing each tree.
        'scale_pos_weight' : 1, # Balancing of positive and negative weights
        'random_state' : 27, # Random number seed
        'tree_method': 'exact' # Tree construction algorithm
}
```

Here, the parameter 'n_estimator' can be used to define the optimized number of trees/rounds for estimation. In some embodiments, the parameter 'learning_rate' can be used to fine tune the model for increased accuracy.

Figure 21:
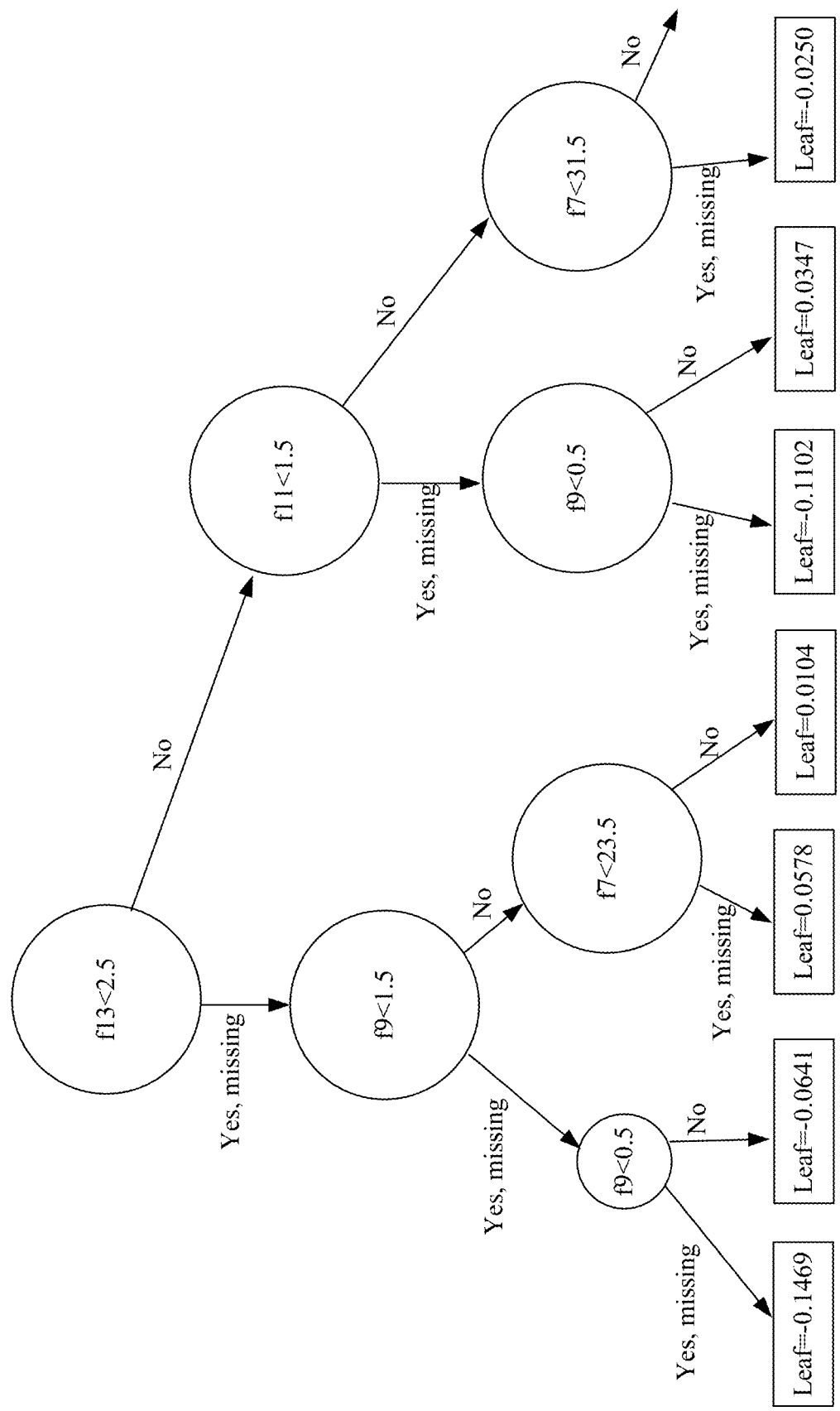
FIG. 21 shows an example section of a decision tree of a final lien/claim recommendation (FLR) model in accordance with one or more embodiments of the present technology.

FIG. 21 shows an example section of a decision tree of an FLR model in accordance with one or more embodiments of the present technology. In some embodiments, multiple tress can be constructed in parallel to achieve faster computing speed.

Table 2 shows an example of input fields for FLR determination. In some embodiments, all the input fields are used in the training. In some embodiments, a subset of the fields is selected for training.

TABLE 2

Example input fields for FLR determination

| Input | Description |
|---|---|
| 1. seq_id: | Sequence identifier for each claim |
| 2. context_cd: | Context identifier |
| 3. case_type_cd: | Case type identifier |
| 4. head_ind: | Set value as "1" if injury description indicates head injury |
| 5. back_ind: | Set value as "1" if injury description indicates back injury |
| 6. body_ind: | Set value as "1" if injury description indicates body/torso injury |
| 7. hip_ind: | Set value as "1" if injury description contains one of the following strings |
| 8. leg_ind: | Set value as "1" if injury description contains one of the following strings |
| 9. arm_ind: | Set value as "1" if injury description contains one of the following strings |
| 10. age: | Actual patient's age at the time of the Medicare services |
| 11. gender: | Patient's gender |
| 12. days: | Number of days since incident |
| 13. related_paid_dollars: | Sum of paid dollars for all the related claims |
| 14. related_paid_claims: | Count of all the related claims |
| 15. unrelated_paid_dollars: | Sum of paid dollars for all the unrelated claims |
| 16. unrelated_paid_claims: | Count of all the unrelated claims |
| 17. count_30: | Count of related claims in the past 30 days |
| 18. count_60: | Count of related claims in the past 60 days |
| 19. count_90: | Count of related claims in the past 90 days |
| 20. count_180: | Count of related claims in the past 180 days |
| 21. count_360: | Count of related claims in the past 360 days |

In some embodiments, the model is trained through multiple epochs. In some embodiments, the training process provides an early stop option to stop the training when no further improvement is monitored. In some embodiments, the full data set provided by Informatica ETL (as shown in FIG. 15) is divided into two parts: a first subset of the data (e.g., 60%) is used for training, and a second subset of the data (e.g., 40%) is used for verification of the training accuracy.

Figure 22:
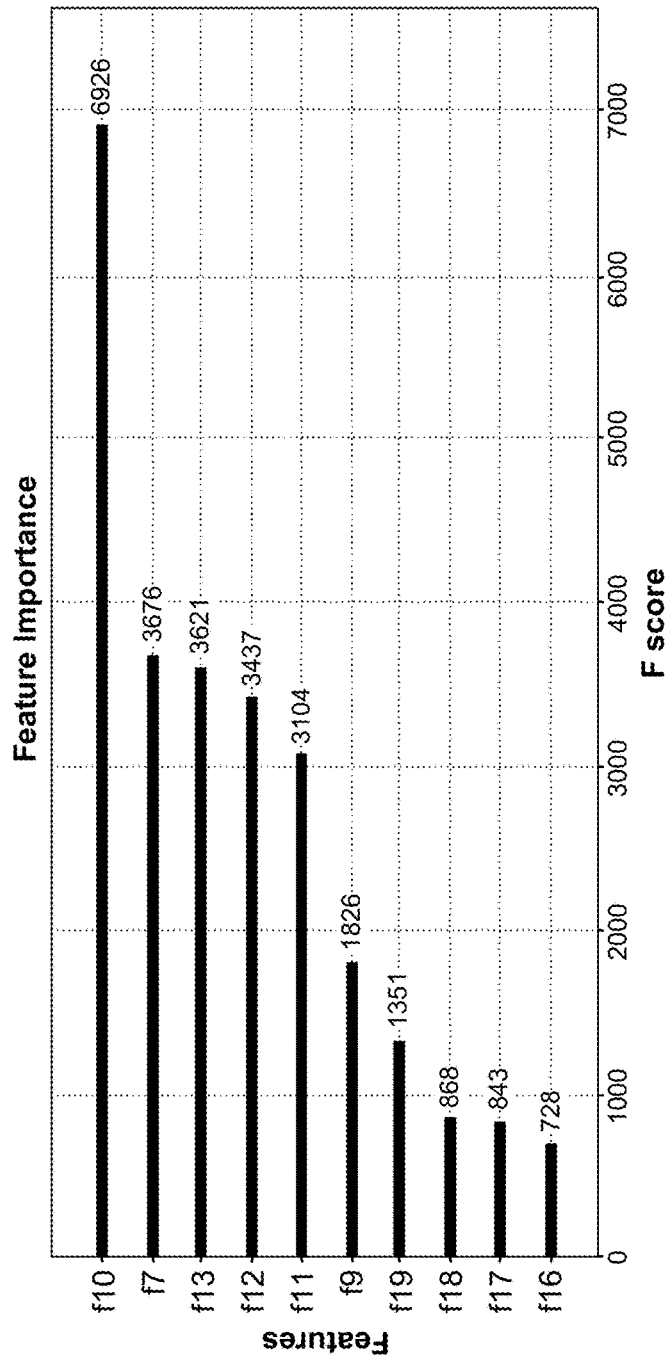
FIG. 22 is a chart illustrating several important features in an example FLR training process in accordance with one or more embodiments of the present technology.

FIG. 22 is a chart illustrating several important features in an example FLR training process in accordance with one or more embodiments of the present technology. As shown in FIG. 22, input fields such as sum of paid amount for all the related claims, age of the patient, number of unrelated claims, sum of paid dollars for all the unrelated claims are important features to obtain an accurate prediction model.

Figure 23:
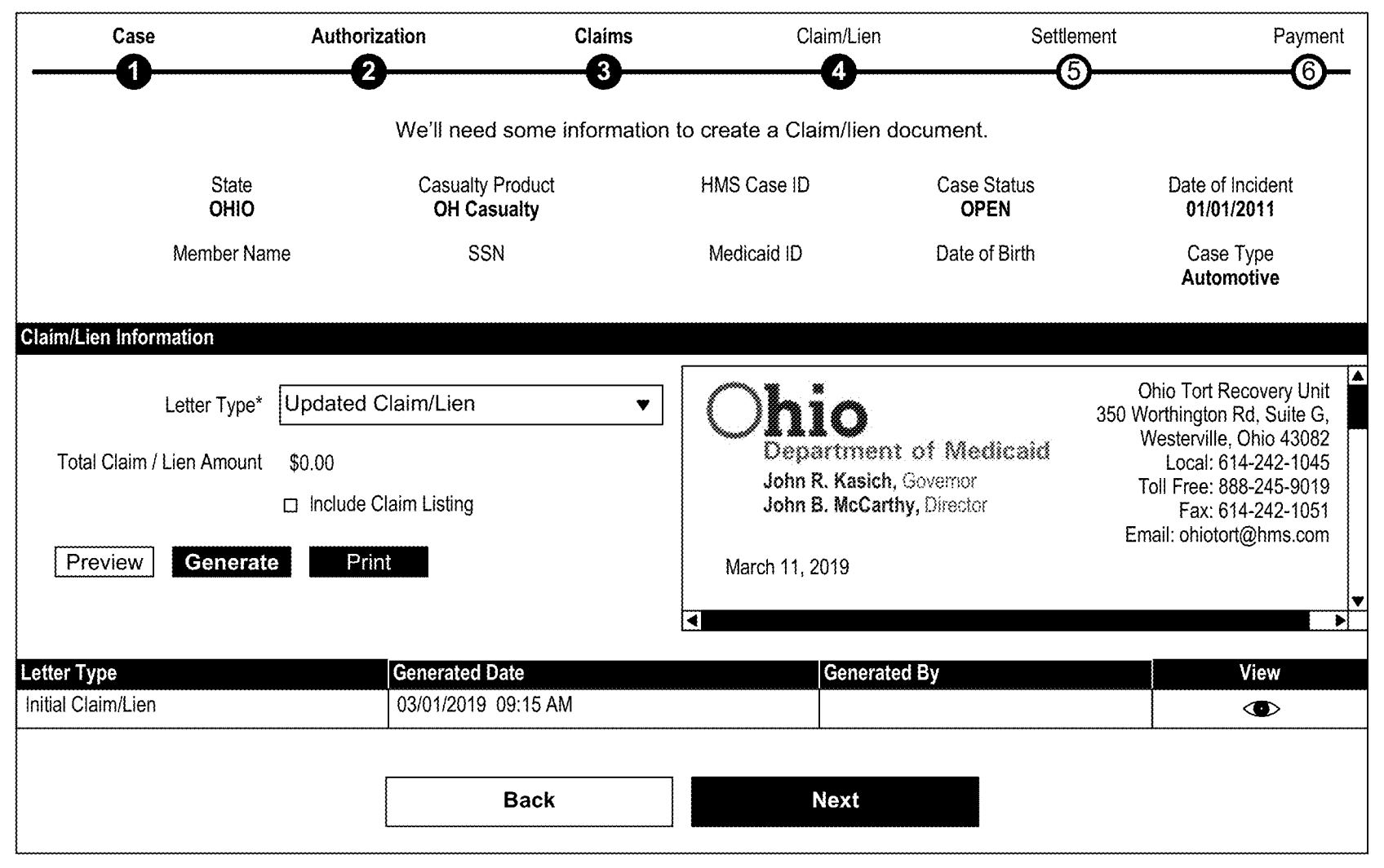

Once the FLR model is trained and deployed, the AI engine executes an inference process based on the model to generate a probability value for FLR. The subrogation case management platform determines whether to issue a letter by comparing the probability value with a predefined threshold (e.g., 50%). FIG. 23 illustrates an example screenshot of a user interface showing a Final Lien Recommendation letter issued by the platform.

Attorney Notification

As discussed in connection with FIG. 13, members can be notified about progress of the case at various stages. Platform users have the option to select notification preferences, such as text messages, email, or none. Users can change the preferences at any time.

Figure 24:
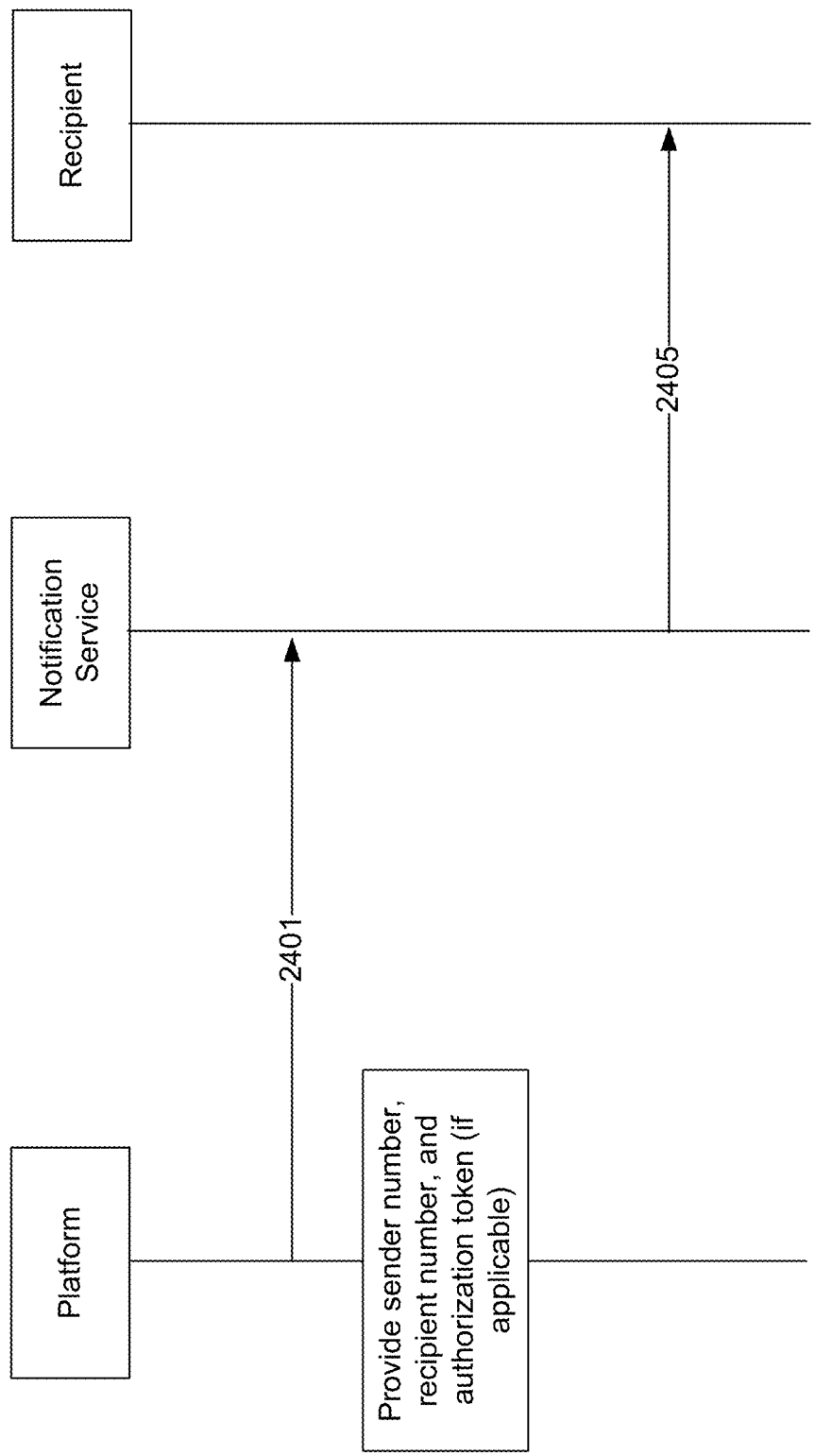
FIG. 24 is a sequence diagram showing an example of invoking a notification service to send notifications to a recipient in accordance with one or more embodiments of the present technology.

If the user sets the preference as text messages, the platform can send notification messages to users via a third-party notification service. FIG. 24 is a sequence diagram showing an example of invoking a notification service to send notifications to a recipient in accordance with one or more embodiments of the present technology. The platform calls into the notification service at operation 2401 and provides sender number, recipient number, and other required information such as an authorization token. The third-party notification service then proceeds to send the message to the recipient at operation 2405.

The plaintiff attorney can receive notifications in scenarios including, but not limited to, receiving a new claim for a case, a claim or a document pending for review by the attorney, a medical authorization expiring, and/or an FLR being issued.

Compromise Request

The platform also allows parties to request a compromise and/or negotiate the final claim/lien amount. FIG. 25 illustrates an example screenshot of a user interface showing a compromise request in accordance with one or more embodiments of the present technology. Once a compromise is agreed upon and the final claim/lien amount is paid, the case can be closed by the platform.

Figure 27:
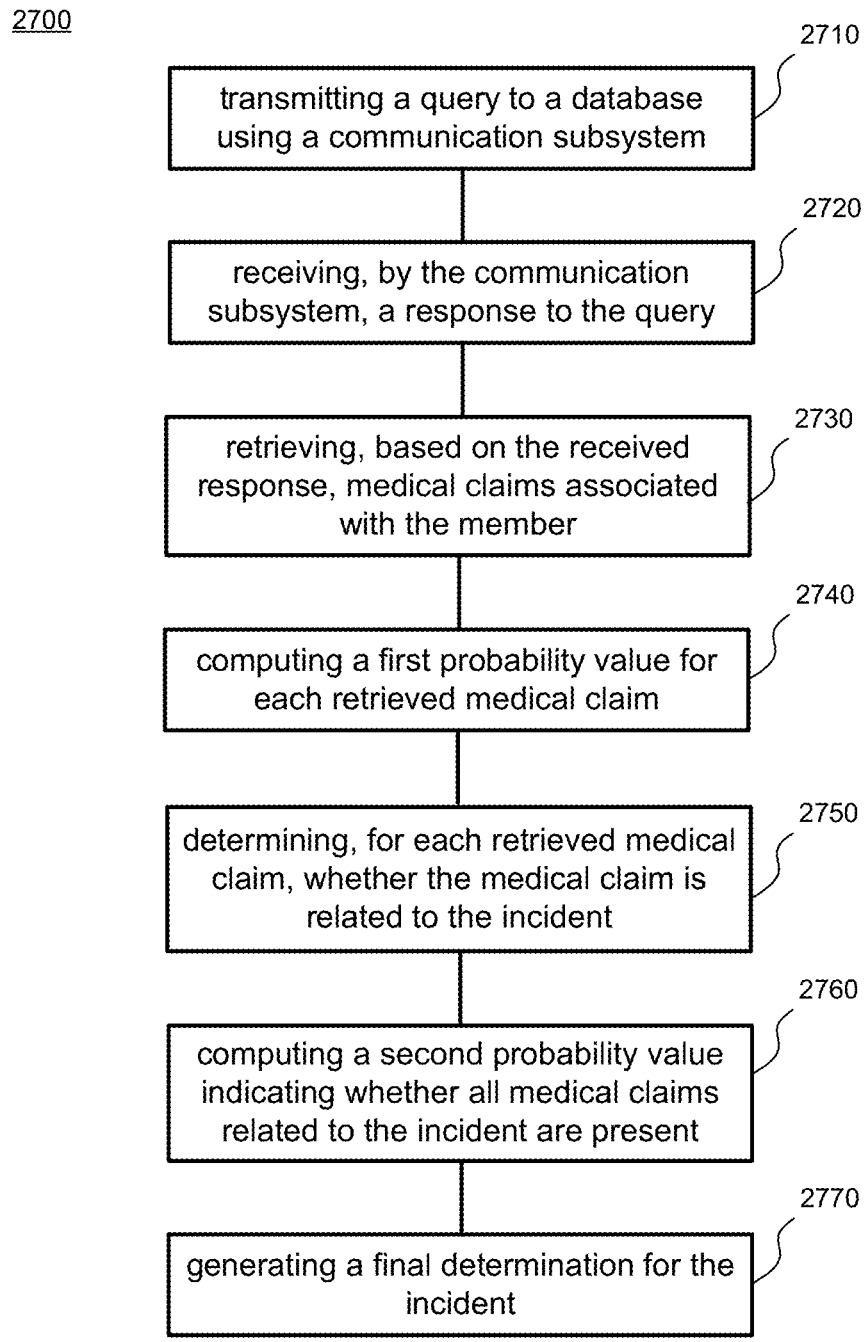
FIG. 27 is a flowchart representation of a method for facilitating automated subrogation case processing in accordance with one or more embodiments of the present technology.

FIG. 27 is a flowchart representation of a method for facilitating automated subrogation case processing in accordance with one or more embodiments of the present technology. The method 2700 includes, at operation 2710, transmitting a query to a database using a communication subsystem. The query includes information indicative of an incident associated with a member. The method 2700 includes, at operation 2720, receiving, by the communication subsystem, a response to the query indicative of associated medical information for the member. The method 2700 includes, at operation 2730, retrieving, based on the received response, medical claims associated with the member. The method 2700 includes at operation 2740, computing, using a computation subsystem that is at least partially implemented using electronic circuits, a first probability value for each retrieved medical claim. The first probability indicates a relatedness of the medical claim to the incident. The method 2700 includes, at operation 2750, determining, for each retrieved medical claim, whether the medical claim is related to the incident by comparing the first probability value with a first predefined threshold. The method 2700 includes, at operation 2760, computing, using the computation subsystem, a second probability value indicating whether all medical claims related to the incident are present. The method 2700 also includes, at operation 2770, generating a final determination for the incident by comparing the second probability value with a second predefined threshold.

In some embodiments, the method further includes obtaining a first set of training data that includes information of multiple past incidents. Each of the multiple past incidents has one or more related medical claims and each medical claim including at least an age of a corresponding member, one or more diagnosis codes, one or more drug codes, or one or more procedural codes. The method also includes training, by the computation subsystem, a claim valuation model based on at least one of the age of the corresponding member, the one or more diagnosis codes, the one or more drug codes, or the one or more procedural codes of the first set of training data. In some embodiments, computing the first probability value comprises determining the first probability value by obtaining an inference result of the medical claim using the claim valuation model. In some embodiments, the training comprises training the claim valuation model using a gradient boosting technique. In some embodiments, the gradient boosting technique uses a decision tree having a maximum depth of five.

In some embodiments, the method further includes obtaining a second set of training data that includes information of multiple past incidents. Each of the multiple past incidents includes at least an age of a corresponding member, a sum of paid amount for all related medical claims, a number of unrelated medical claims, or a sum of paid amount for all the unrelated medical claims. The method also includes training, by the computation subsystem, a final recommendation model based on at least one of the age of the corresponding member, the sum of paid amount for all the related medical claims, the number of the unrelated medical claims, or the sum of paid amount for all the unrelated medical claims in the second set of training data. In some embodiments, computing the second probability value comprises determining the second probability value by obtaining an inference result based on the incident and the retrieved medical claims using the final recommendation model. In some embodiments, the training comprises training the final recommendation model using a gradient boosting technique. In some embodiments, the gradient boosting techniques uses a decision tree having a maximum depth of five.

Computer

Figure 26:
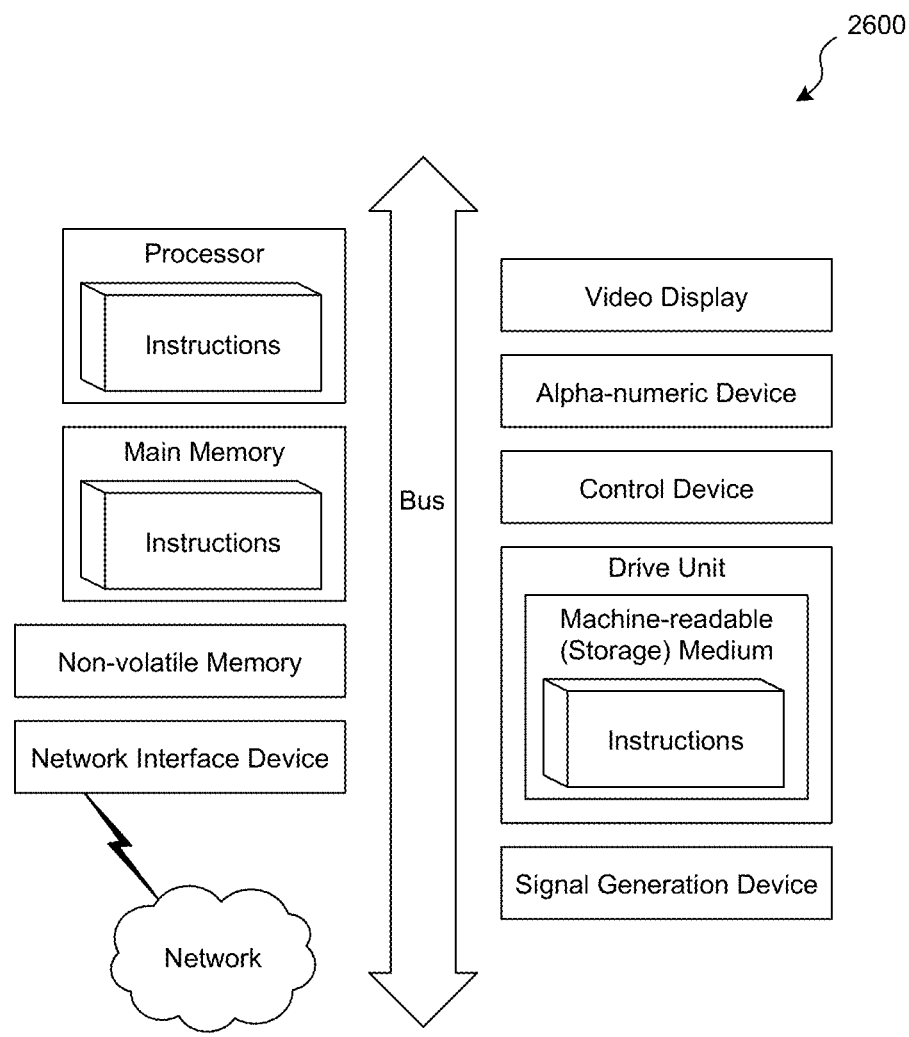
FIG. 26 is a diagrammatic representation of a machine in the example form of a computer system within which a set of instructions, for causing the machine to perform any one or more of the methodologies or modules discussed herein, can be executed.

FIG. 26 is a diagrammatic representation of a machine in the example form of a computer system 2600 within which a set of instructions, for causing the machine to perform any one or more of the methodologies or modules discussed herein, can be executed.

In the example of FIG. 26, the computer system 2600 includes a processor, memory, non-volatile memory, and an interface device. Various common components (e.g., cache memory) are omitted for illustrative simplicity. The computer system 2600 is intended to illustrate a hardware device on which any of the components described in the example of FIGS. 1-24 (and any other components described in this specification) can be implemented. The computer system 2600 can be of any applicable known or convenient type. The components of the computer system 2600 can be coupled together via a bus or through some other known or convenient device.

This disclosure contemplates the computer system 2600 taking any suitable physical form. As example and not by way of limitation, computer system 2600 can be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 2600 can include one or more computer systems 2600; be unitary or distributed; span multiple locations; span multiple machines; or reside in a cloud, which can include one or more cloud components in one or more networks. Where appropriate, one or more computer systems 2600 can perform without substantial spatial or temporal limitation one or more steps of one or more methods described or illustrated herein. As an example, and not by way of limitation, one or more computer systems 2600 can perform in real time or in batch mode one or more steps of one or more methods described or illustrated herein. One or more computer systems 2600 can perform, at different times or at different locations, one or more steps of one or more methods described or illustrated herein, where appropriate.

The processor can be, for example, a conventional microprocessor such as an Intel Pentium microprocessor or Motorola PowerPC microprocessor. One of skill in the relevant art can recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer system 2600. The non-volatile storage can be local, remote, or distributed. The non-volatile memory is optional because systems can be created with all applicable data available in memory. A typical computer system can usually include at least a processor, memory, and a device (e.g., a bus) coupling the memory to the processor.

Software is typically stored in the non-volatile memory and/or the drive unit. Indeed, storing an entire large program in memory may not be possible. Nevertheless, it should be understood that for software to run, if necessary, it is moved to a computer-readable location appropriate for processing, and for illustrative purposes, that location is referred to as the memory in this paper. Even when software is moved to the memory for execution, the processor can typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It can be appreciated that a modem or network interface can be considered to be part of the computer system 2600. The interface can include an analog modem, ISDN modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 22 reside in the interface.

In operation, the computer system 2600 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts utilized by the operating system to input and output data and to store data in the memory, including storing files on the non-volatile memory and/or drive unit.

Some portions of the detailed description can be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems can be used with programs in accordance with the teachings herein, or it can prove convenient to construct more specialized apparatus to perform the methods of some embodiments. The utilized structure for a variety of these systems can appear from the description below. In addition, the techniques are not described with reference to any particular programming language, and various embodiments can thus be implemented using a variety of programming languages.

In alternative embodiments, the machine operates as a standalone device or can be connected (e.g., networked) to other machines. In a networked deployment, the machine can operate in the capacity of a server or a client machine in a client-server network environment, or as a peer machine in a peer-to-peer (or distributed) network environment.

The machine can be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, can be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art can appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, can comprise a transformation, such as a physical transformation. With particular types of memory devices, such a physical transformation can comprise a physical transformation of an article to a different state or thing. For example, but without limitation, for some types of memory devices, a change in state can involve an accumulation and storage of charge or a release of stored charge. Likewise, in other memory devices, a change of state can comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device can comprise a transformation, such as a physical transformation. Rather, the foregoing is intended as illustrative examples.

A storage medium typically can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling others skilled in the relevant art to understand the claimed subject matter, the various embodiments, and the various modifications that are suited to the particular uses contemplated.

While embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Although the above Detailed Description describes certain embodiments and the best mode contemplated, no matter how detailed the above appears in text, the embodiments can be practiced in many ways. Details of the systems and methods may vary considerably in their implementation details, while still being encompassed by the specification. As noted above, particular terminology used when describing certain features or aspects of various embodiments should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless those terms are explicitly defined herein. Accordingly, the actual scope of the invention encompasses not only the disclosed embodiments, but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

What is claimed is:

1. A computer-implemented method for facilitating automated subrogation case processing, comprising:
    transmitting a query to a database using a communication subsystem, the query including information indicative of an incident associated with a member;
    receiving, by the communication subsystem, a response to the query indicative of associated medical information for the member;
    retrieving, based on the received response, medical claims associated with the member;
    computing, using a computation subsystem that is at least partially implemented using electronic circuits, a first probability value for each retrieved medical claim, the first probability indicating a relatedness of the medical claim to the incident;
    determining, for each retrieved medical claim, whether the medical claim is related to the incident by comparing the first probability value with a first predefined threshold;
    computing, using the computation subsystem, a second probability value indicating whether all medical claims related to the incident are present; and
    generating a final determination for the incident by comparing the second probability value with a second predefined threshold, wherein the method further comprises:
    obtaining a first set of training data that includes information of multiple past incidents, each of the multiple past incidents having one or more related medical claims and each medical claim including at least an age of a corresponding member, one or more diagnosis codes, one or more drug codes, or one or more procedural codes; and
    training, by the computation subsystem, a claim valuation model based on at least one of the age of the corresponding member, the one or more diagnosis codes, the one or more drug codes, or the one or more procedural codes of the first set of training data,
    wherein the training comprises training the claim valuation model using a gradient boosting technique.

2. The method of claim 1, wherein computing the first probability value comprises:
    determining the first probability value by obtaining an inference result of the medical claim using the claim valuation model.

3. The method of claim 1, wherein the gradient boosting technique uses a decision tree having a maximum depth of five.

4. The method of claim 1, comprising:
obtaining a second set of training data that includes information of multiple past incidents, each of the multiple past incidents including at least an age of a corresponding member, a sum of paid amount for all related medical claims, a number of unrelated medical claims, or a sum of paid amount for all the unrelated medical claims; and
training, by the computation subsystem, a final recommendation model based on at least one of the age of the corresponding member, the sum of paid amount for all the related medical claims, the number of the unrelated medical claims, or the sum of paid amount for all the unrelated medical claims in the second set of training data.

5. The method of claim 4, wherein computing the second probability value comprises:
determining the second probability value by obtaining an inference result based on the incident and the retrieved medical claims using the final recommendation model.

6. The method of claim 4, wherein the training comprises training the final recommendation model using a gradient boosting technique.

7. The method of claim 6, wherein the gradient boosting techniques uses a decision tree having a maximum depth of five.

8. A device for automated subrogation case processing, the device comprising:
a processor; and
a memory including instruction stored thereon, wherein the instructions upon execution by the processor cause the processor to:
transmit a query to a database, the query including information indicative of an incident associated with a member;
receive a response to the query indicative of an associated medical information for the member;
retrieve, based on the received response, medical claims associated with the member;
compute, for each retrieved medical claim, a first probability value indicating a relatedness of the medical claim to the incident;
determine, for each retrieved medical claim, whether the medical claim is related to the incident by comparing the first probability value with a first predefined threshold;
compute a second probability value indicating whether all medical claims related to the incident are present; and
generate a final determination for the incident by comparing the second probability value with a second predefined threshold,
wherein the processor is further configured to:
receive a set of training data that includes information of multiple past incidents, each of the multiple past incidents including at least an age of a corresponding member, a sum of paid amount for all related medical claims, a number of unrelated medical claims, or a sum of paid amount for all the unrelated medical claims;
train a final recommendation model based on at least one of the age of the corresponding member, the sum of paid amount for all the related medical claims, the number of the unrelated medical claims, or the sum of paid amount for all the unrelated medical claims in the set of training data, and
the processor is configured to compute the second probability value based on:
determining an inference result based on the incident and the retrieved medical claims using the final recommendation model.

9. The device of claim 8, wherein the processor is configured to:
receive an additional set of training data that includes information of multiple past incidents, each of the multiple past incidents having one or more related medical claims and each medical claim including at least an age of a corresponding member, one or more diagnosis codes, one or more drug codes, or one or more procedural codes; and
train a claim valuation model based on at least one of the age of the corresponding member, the one or more diagnosis codes, the one or more drug codes, or the one or more procedural codes of the additional set of training data.

10. The device of claim 9, wherein the processor is configured to compute the first probability value based on:
determining an inference result of the medical claim using the claim valuation model.

11. The device of claim 10, wherein the processor is configured to train the claim valuation model using a gradient boosting technique with a decision tree that has a maximum depth of five.

12. The device of claim 8, wherein the processor is configured to compute the first probability value based on:
determining an inference result based on the incident and the retrieved medical claims using the final recommendation model.

13. The device of claim 8, wherein the processor is configured to train the claim valuation model using a gradient boosting technique with a decision tree that has a maximum depth of five.

14. A system for automated subrogation case processing, comprising
one or more processors; and
one or more memory units including instruction stored thereon, wherein the instructions upon execution by the one or more processors cause the one or more processors to implement a subrogation case management platform including:
a presentation-layer module configured to provide a user-interface for a member of the platform to interact and retrieve information;
a service-layer module in communication with the presentation-layer module to obtain information indicative of an incident associated with the member via the user-interface, wherein the service-layer module comprises an address verification module, a member authorization module, a notification module, and a data layer module, the service-layer module further comprising:
a case-management service configured to communicate with the address verification module to verify an address of the member, to communicate with the medical authorization module to obtain a medical authorization from the member, to communicate with the notification module to notify the member of a change in processing the incident, and to communicate with the data layer to retrieve medical claims of the member from one or more databases based on the information indicative of the incident, the case-management service further comprising a computation subsystem configured to:

compute, for each retrieved medical claim, a first probability value indicating a relatedness of the medical claim to the incident;

determine, for each retrieved medical claim, whether the medical claim is related to the incident by comparing the first probability value with a first predefined threshold;

compute a second probability value indicating whether all medical claims related to the incident are present; and generate a final determination for the incident by comparing the second probability value with a second predefined threshold, wherein the case-management service is further configured to:

train a claim valuation model based on a first set of input data;

train a final recommendation model based on a second set of input data; and deploy the claim valuation model and the final recommendation model upon determining that the claim valuation model and the final recommendation model achieve a predefined level of accuracy; and wherein the case-management service further comprises a job scheduler configured to retrain the claim valuation model or the final recommendation model.

* * * * *